United States Patent
Li et al.

(10) Patent No.: US 11,108,830 B2
(45) Date of Patent: Aug. 31, 2021

(54) SYSTEM FOR COORDINATIVE SECURITY ACROSS MULTI-LEVEL NETWORKS

(71) Applicant: Avago Technologies International Sales Pte. Limited, Singapore (SG)

(72) Inventors: Yong Li, San Diego, CA (US); Xuemin Chen, San Diego, CA (US); Weimin Zhang, San Jose, CA (US); Victor Liang, Irvine, CA (US); Binfan Liu, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 253 days.

(21) Appl. No.: 16/049,336

(22) Filed: Jul. 30, 2018

(65) Prior Publication Data

US 2019/0289038 A1    Sep. 19, 2019

Related U.S. Application Data

(60) Provisional application No. 62/642,484, filed on Mar. 13, 2018.

(51) Int. Cl.
| | |
|---|---|
| *H04L 29/06* | (2006.01) |
| *H04L 9/32* | (2006.01) |
| *H04L 29/08* | (2006.01) |
| *G06N 20/00* | (2019.01) |

(52) U.S. Cl.
CPC ........... *H04L 63/205* (2013.01); *G06N 20/00* (2019.01); *H04L 9/3226* (2013.01); *H04L 63/0227* (2013.01); *H04L 63/0281* (2013.01); *H04L 67/28* (2013.01); *H04L 63/145* (2013.01)

(58) Field of Classification Search
USPC ........................................................ 713/168
See application file for complete search history.

(56) References Cited

U.S. PATENT DOCUMENTS

| | | | |
|---|---|---|---|
| 6,092,191 A | 7/2000 | Shimbo et al. | |
| 10,079,836 B2 * | 9/2018 | Klein | H04W 12/06 |

(Continued)

FOREIGN PATENT DOCUMENTS

| | | | | |
|---|---|---|---|---|
| GB | 2560671 B * | 6/2019 | ........... | H04W 12/02 |

*Primary Examiner* — Eleni A Shiferaw
*Assistant Examiner* — Sakinah W Taylor
(74) *Attorney, Agent, or Firm* — Foley & Lardner LLP

(57) ABSTRACT

In some aspects, the disclosure is directed to methods and systems for providing coordinative security among network devices across multi-level networks. Shared cryptographic secrets among the network devices are used as the basis for mutual security authentication and peering among these devices. The cryptographic secrets can be embedded in the SoC devices for these devices or dynamically generated based on unique identification information and attributes of these SoC devices. The messages for authentication and peering can be communicated directly among the network devices or indirectly via a cloud security portal entity that acts as a messaging proxy. The mutual authentication and peering process can be carried out coordinately among the network devices and a cloud security portal in a one-to-one mesh relationship, or in a transitive layering relationship, where each network entity authenticates and peers with its direct subordinates in a multi-level network.

12 Claims, 17 Drawing Sheets

(56) References Cited

U.S. PATENT DOCUMENTS

| | | | |
|---|---|---|---|
| 2006/0282666 A1* | 12/2006 | Kim | H04L 9/0822 713/163 |
| 2009/0193506 A1* | 7/2009 | McGrew | H04L 63/0263 726/6 |
| 2009/0238182 A1* | 9/2009 | Yanagihara | H04L 12/1854 370/390 |
| 2010/0071024 A1* | 3/2010 | Eyada | H04L 63/1458 726/1 |
| 2010/0184405 A1* | 7/2010 | Chen | H04W 4/18 455/410 |
| 2011/0289314 A1* | 11/2011 | Whitcomb | H04L 9/085 713/155 |
| 2012/0011360 A1* | 1/2012 | Engels | H04L 9/083 713/166 |
| 2012/0016951 A1* | 1/2012 | Li | H04L 67/10 709/217 |
| 2013/0091540 A1* | 4/2013 | Chen | H04W 4/21 726/1 |
| 2014/0115330 A1* | 4/2014 | Chen | H04L 63/105 713/166 |
| 2015/0103821 A1* | 4/2015 | Gilson | H04L 47/76 370/360 |
| 2016/0219051 A1* | 7/2016 | Morita | H04L 63/0876 |
| 2016/0365975 A1 | 12/2016 | Smith | |
| 2017/0078252 A1* | 3/2017 | Klein | H04L 9/3226 |
| 2017/0126647 A1* | 5/2017 | Zhang | H04L 63/126 |

* cited by examiner

SYSTEM FOR COORDINATIVE SECURITY ACROSS MULTI-LEVEL NETWORKS

RELATED APPLICATIONS

The present application claims the benefit of and priority to U.S. Provisional Patent Application No. 62/642,484, entitled "System for Coordinative Security across Multi-Level Networks," filed Mar. 13, 2018, the entirety of which is incorporated by reference herein.

FIELD OF THE DISCLOSURE

This disclosure generally relates to systems and methods for providing network and communications security across multi-level networks.

BACKGROUND OF THE DISCLOSURE

Multi-level networks are usually organized into a hierarchical network topology which extends from data sources such as cloud servers to end client devices via intermediate network nodes. Typical examples of such networks are broadband access and video networks operated by the cable, telecom, wireless, and satellite service providers.

These networks may present unique challenges for monitoring, analysis, and mitigation of security threats and attack vectors due to their non-homogenous layered nature.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
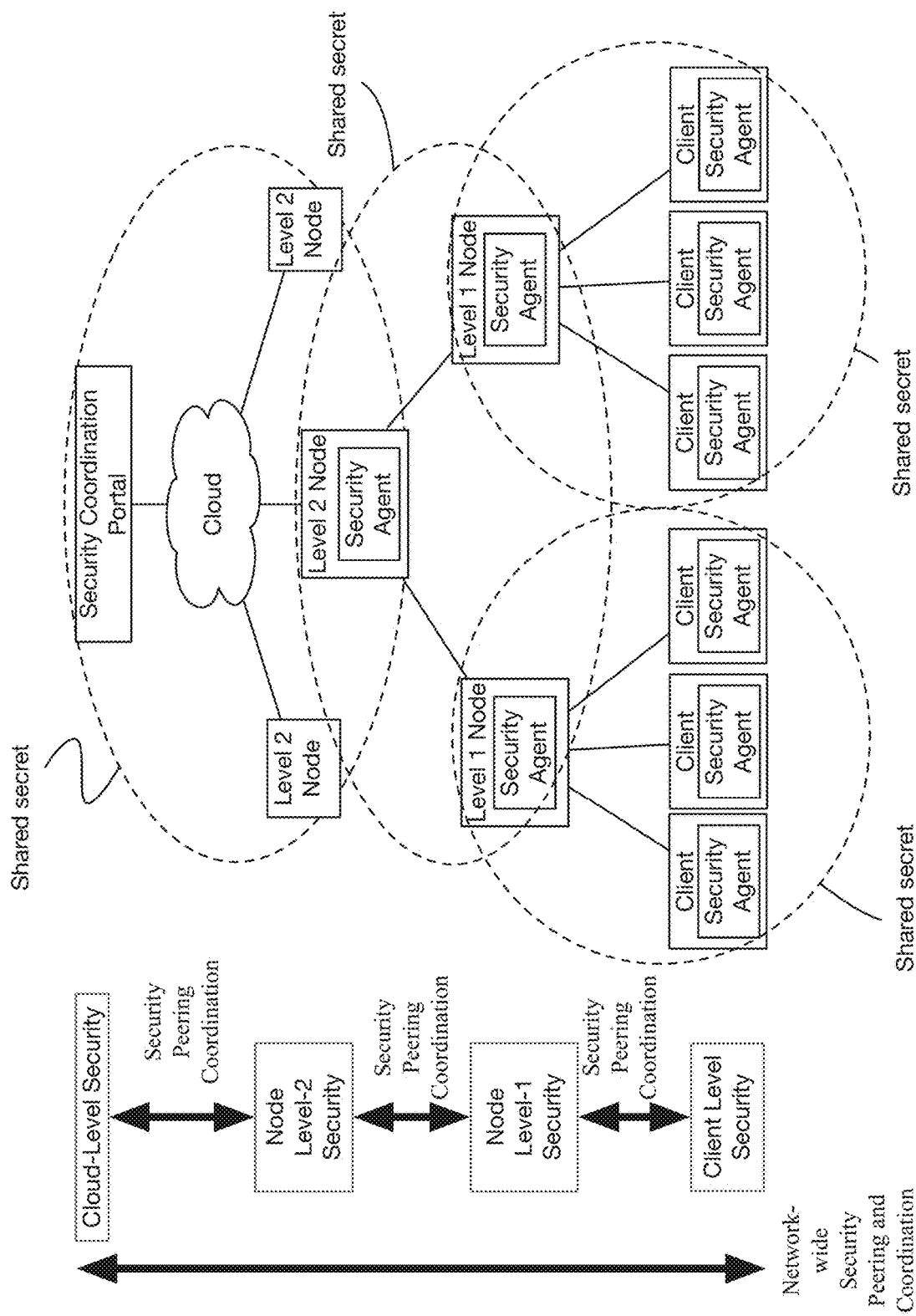
FIG. 1 is a block diagram of an embodiment of a hierarchical network topology.

The details of various embodiments of the methods and systems are set forth in the accompanying drawings and the description below.

DETAILED DESCRIPTION

The following DOCSIS standard(s), including any draft versions of such standard(s), are hereby incorporated herein by reference in their entirety and are made part of the present disclosure for all purposes: DOCSIS 2.0/3.0/3.1; and DOCSIS 3.1 FDX. Although this disclosure may reference aspects of these standard(s), the disclosure is in no way limited by these standard(s).

For purposes of reading the description of the various embodiments below, the following descriptions of the sections of the specification and their respective contents may be helpful:

- Section A describes embodiments of systems and methods for coordinative security;
- Section B describes embodiments of systems and methods for cloud-assisted monitoring and filtering with multi-layer triggers; and
- Section C describes a network environment and computing environment which may be useful for practicing embodiments described herein.

A. Systems and Methods for Coordinative Security Across Multi-Level Networks The systems and methods discussed herein provide coordinative security among System-on-Chips (SoCs) in network devices across multi-level networks. Shared cryptographic secrets among these SoCs in network devices are used as the basis for mutual security authentication and peering among the network devices. The cryptographic secrets are embedded in the SoCs for the network devices or dynamically generated based on unique identification information and attributes of these SoCs. The messages for authentication and peering can be communicated directly among the SoCs in the network devices or indirectly via a cloud security portal entity that acts as a messaging proxy. The mutual authentication and peering process can be carried out coordinately among the SoCs in the network devices and a cloud security portal in a one-to-one mesh relationship, or in a transitive layering relationship, where each SoC in the network device authenticates and peers with its direct subordinates in a multi-level network.

The system described herein enhances network-wide security via one or more of the following main mechanisms, alone or in combination in various embodiments:

Network-Wide Authentication, Peering, and Trust

A network node device shares a cryptographic secret with all its direct subordinate node devices in the network hierarchy. This sharing may be realized by the particular design of these devices or generated via certain communication protocol.

With the shared secret, a SoC in the network node device executes a mutual authentication and peering procedure with SoCs in its direct subordinate node devices in the network hierarchy.

Each node device in every level of the network hierarchy coordinates and performs the above mutual authentication and peering, such that all end devices and intermediate node devices in the network are securely chained from the root devices all way up to the cloud servers. This chained security relationships across the network realizes the network-wide authentication, peering, and trust.

Network-Wide Secure Monitoring

Each end device and intermediate node device performs network diagnostics and secure monitoring of its own operation to detect any abnormality that indicates the security violation and malicious intrusion.

A network node device coordinates and solicits and exchanges diagnostics and monitoring status information with its direct subordinate node devices in the network hierarchy.

Each end device and immediate node device executes mitigation functions based on the diagnostics and monitoring status of its own and its superior and subordinates.

All these may be performed by SoCs within the corresponding devices.

Cloud-Based Security Coordination

A web-based or cloud-based Security Coordination Portal pulls and receives pushed messages and analytic data associated from the end devices and intermediate node devices, in connection with Network-Wide Authentication, Peering, and Trust as well as Network-Wide Secure Monitoring.

The Security Coordination Portal detects network-wide security abnormality by correlating the analytic data from multiple levels of end devices and intermediate node devices.

The Security Coordination Portal acts as a proxy for the end devices and intermediate node devices that cannot directly communicate with each other but can communicate with the Portal itself. The proxy functions support general communication needs of these devices, and in particular allow them to exchange messages required for the Network-Wide Authentication, Peering, and Trust as well as Network-Wide Secure Monitoring A block diagram illustrating an example embodiment of a network topology for the disclosed system is shown in FIG. 1. As shown, the example network has a tree-based hierarchical structure comprising 4 levels:

The Client Device (bottom-most) level represents leaves of the network tree, and consists of Client Devices for end users and similar such devices (appliances, end devices, clients, etc.).

Two intermediate Node Levels (Node Level 1 and Node Level 2).

The Cloud Level, connecting to broader networks (e.g. wide area networks such as the Internet), cloud servers and content servers, and the Security Coordination Portal, provided by a network accessible computing device (e.g. virtual machine, cloud service, web service, etc.).

Each end device and intermediate node device has an embedded Security Agent (SA) in its SoC that is responsible for the relevant security functions for its embedding host device. For each non-leaf node device, its SA contains or has access to a cryptographic secret that is shared with all its direct subordinates, as indicated in FIG. 1; the secret may be embedded in the SoC of the device upon production, or generated via a key-distribution protocol.

In operation, each non-leaf node device performs an authentication procedure to mutually authenticate all direct subordinates, using the secret they all share. The successful authentication establishes the secure peering and trust among these node devices. The successful authentication across all levels of the network hierarchy establishes the secure chaining from the leaf devices all way up to the cloud Security Coordination Portal. Such secure chaining across the network in turn establishes the secure peering and trust across the entire network.

Figure 2:
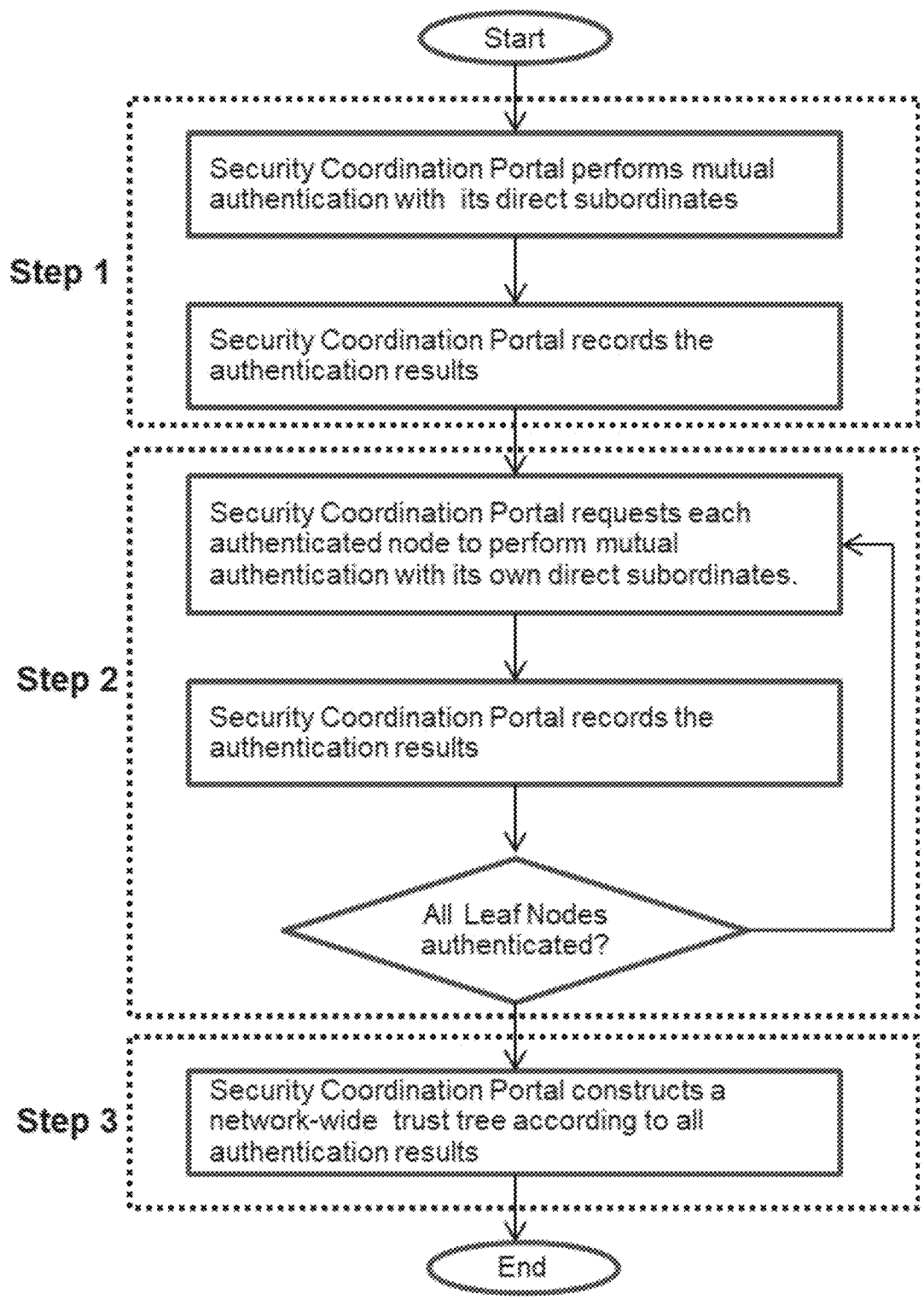
FIG. 2 is a flow chart of an embodiment of a method for network-wide authentication.

FIG. 2 is a flow chart of an embodiment of a method for network-wide authentication. At step 1 in some implementations, the Security Coordination Portal authenticates its direct subordinates (e.g. on Node Level 2) and records the authentication results. If successful, the Portal requests its direct subordinates to initiate their individual authentication of their own direct subordinates (e.g. on Node Level 1) and to report their authentication statuses to the Portal.

In turn, at step 2 in some implementations, each successfully authenticated node device (e.g. on Node Level 1) is requested by the Portal to perform mutual authentication with its own direct subordinates (e.g. leaf devices) and send back the authentication status to the Portal. This may be repeated iteratively until all leaf node devices are authenticated.

At step 3, in some implementations, the Portal constructs a tree of successfully authenticated end devices and intermediate node devices, based on the status information received from all involved devices. As part of this process, the Portal also detects the devices in the network that have failed the authentication.

In the above procedure, if two devices do not have direct IP connectivity, they can indirectly exchange authentication-related messages with each other with the Security Coordination Portal acting as the proxy.

Across the network, the security agents embedded in the SoCs of the end devices and intermediate node devices also perform Network Diagnostics and Security Monitoring of own individual hosts. All security agents report the Security Monitoring analytic data and status to the Security Coordination Portal. With the collected analytic data, the Portal performs global (network-level) Security Monitoring task, and coordinates these agents' security functions that include:

Joint security analysis of a node and its direct subordinates, including analysis of the impact of a subordinate's security status change on its superior; and impact of a superior's security status change on connected subordinates;

Coordinated security detection/assessment and mitigation actions across the network. For instance, if a node's security is seriously compromised, the Portal takes all its downstream nodes and devices offline.

Network Diagnostics

Figure 3:
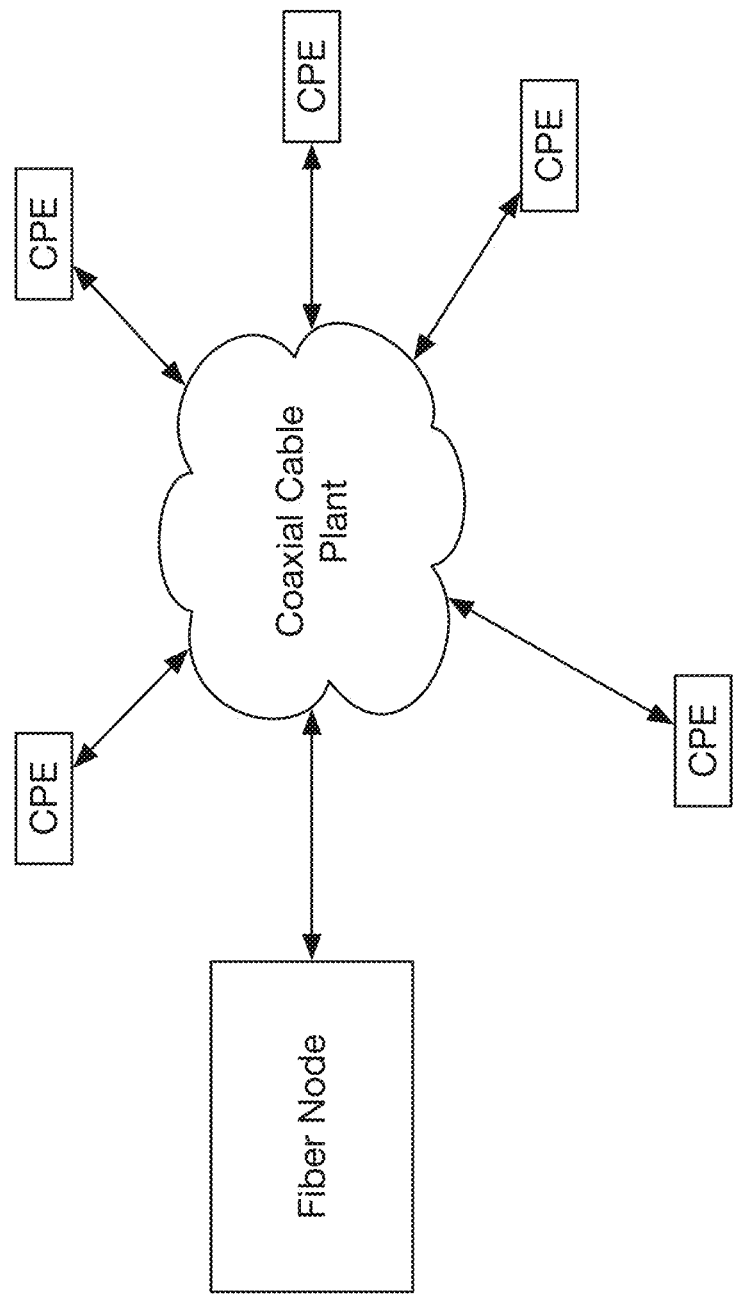
FIG. 3 is a block diagram of an embodiment of a coaxial cable plant network environment.

Traditional data-collection and diagnostics tools on a network such as a coaxial cable plant are normally based on single probe points, looking into issues either within individual customer premises equipment (CPE) or certain probing points of the network, as shown in the block diagram of FIG. 3 for a coaxial cable plant. A CPE may be set in diagnostic mode to diagnose a potential problem with the device at this location (e.g. a cable modem or a two way set top box, or other cable modem enabled devices), and/or to search for interference from the coaxial cable plant.

This approach is useful and effective for relatively simple networks. However, coaxial cable plants can be complicated with amplifiers, diplexers, splitters, cables, and many defects in cable and/or connectors as well as the intermediary devices.

In many implementations, the network topology varies from node to node and plant to plant. For instance, coaxial cable plants may have node sizes varying from under 30 to over 1000 CPE's, and many wiring elements may be buried underground. The basic cable node topology is a tree structure, where a physical media path is shared between the node and many end user houses. However, wiring inside each house or other customer location tends to vary dramatically due to many factors, such as year of construction, user self-installation, re-modelling or re-construction, etc. In many locations around the world, coaxial plants were formed through complicated process, which makes it very difficult for the diagnostics tool to for a reasonable model. The other common problem is associated with security or other unexpected time variant interference. A single point diagnostic strategy will be limited.

Instead, the systems and methods discussed herein provide for a three-part diagnostic strategy: time-synchronized data collection; virtual physical model formation; and network health monitoring.

Timing Synchronized Data Collection

Data collection is crucial for any diagnostic tool. In the systems and methods presented herein, the proposed data collection system provides synchronized collection of time-based information among multiple SoCs in network devices. A control server in the cloud sends control messages to these network devices (e.g. CPE devices), which initiate time-coordinated data collection process among them. A control message from the time server includes information such as:

a) The time at which the data collection is performed. The time can be based on distributed time stamps or centralized "wall clock". In either case, latency factors associated with information propagation, CPU/GPU/DSP and other processing functions in SoCs, and memory access are taken into consideration by the data-collection network devices in determining their individual time bases.
b) The identification of the data to be collected (e.g. RF spectrum information, channel response, etc.)
c) The type of the source for trigger signals (e.g. "Controlled Trigger Source", "Unknown Trigger Source"). A trigger signal affects the data parameters to be collected. For instance, an impulse signal generated by one source network device triggers channel responses measured at other network devices.
d) For Controlled Sources, the source identification and the associated parameters for the trigger signal.

In many cases, due to physical distance or topology limitation, it is impractical to achieve perfect timing synchronization. Therefore, collected physical layer data may be offset by a small amount of time. Such time offsets are kept within an acceptable range so that the necessary time-correlation is preserved in the data collected from different SoCs in network devices. The correlation provides significant information about the network (e.g. physical cable plant) conditions.

Collected data can be categorized into two classes according to the source type of trigger signals: Unknown Trigger Sources, and Controlled Trigger Sources. For Unknown Trigger Sources, the related data is the information collected during the time slot that no known network entity (e.g. CPE or Fiber Node) is commanded by the control server to transmit a trigger signal. This type of data is extremely useful, e.g. when utilized to identify cable plant is healthy and identify potential problems. By cross-correlating the data from different SoCs in network devices, a much richer network picture may be mapped compared with single point data collection.

In comparison, the Controlled Trigger Source data is the information collected when a known device is transmitting trigger signal (for example, a cable downstream quadrature amplitude modulated (QAM) signal transmitted from a Fiber node, or an upstream signal from one particular CPE). For a cable network plant, each individual CPE and Fiber node can be utilized as signal source, which provides different network snapshots from different angles. By comparing collected data from different CPEs with different controlled sources, a detailed network model may be constructed.

There are many ways to synchronize data collection from various SoCs in network devices (e.g. CPE and Fiber node), including DOCSIS upstream timing, such that data collection aligns with a DOCSIS upstream time slot; or via a predefined broadcast message that triggers data collection at each CPE.

For a cable network, essentially all the physical layer parameters are useful for diagnostics, and the time-synchronized data pattern may provide additional details for analysis. Some of the useful information includes: downstream channel by channel signal strength, downstream equalizer coefficients channel by channel, downstream spectrum capture, upstream spectrum capture with different CPE as signal sources, etc.

By using timing synchronized data and the locations of network devices such as CPEs and fiber nodes (data and boundary condition), one can construct a network model for each particular site without actually going into the field to measure the underground cable lengths. By collecting more data and performing more correlation calculations, a higher accuracy model can be constructed. For cable networks, this model includes the coaxial cable physical length, interconnections, and various active and passive components. This model can be used for diagnostics.

Network Diagnostics

Network conditions can be monitored through continued data collection. This may be done in some implementations to further confirm the network model, and/or to monitor the network conditions for changes in any of several different parameters.

Figure 4:
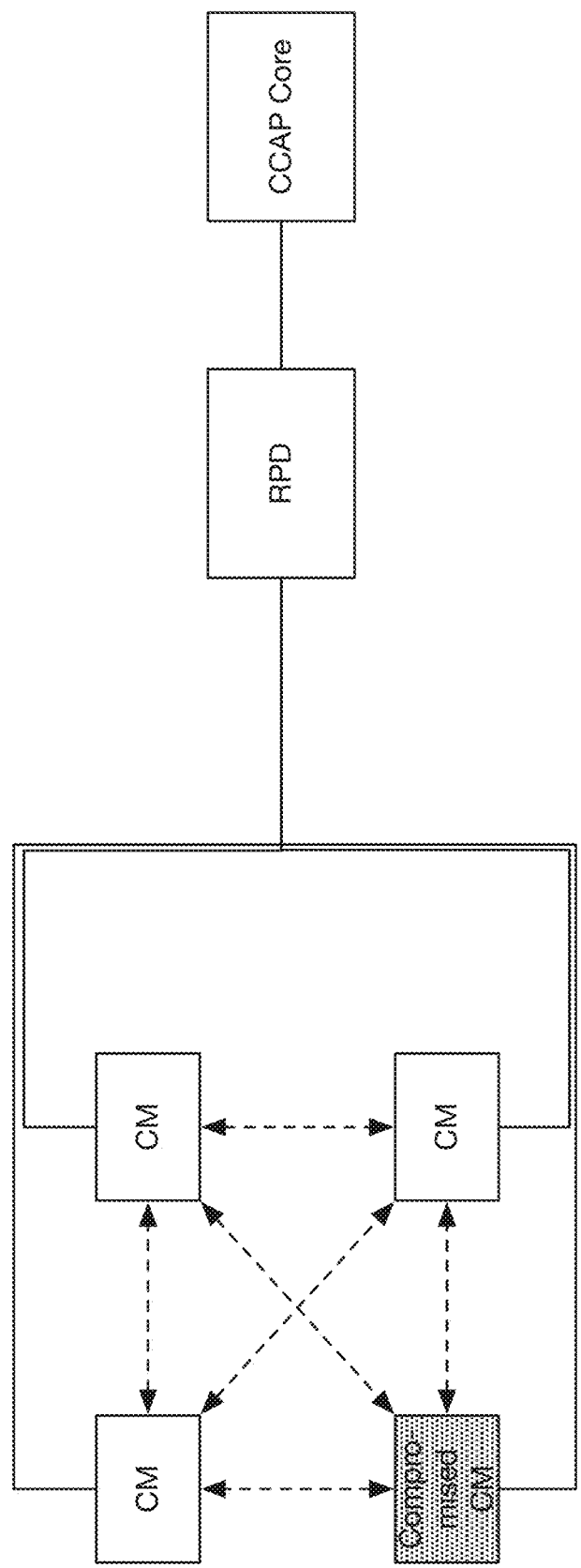
FIG. 4 is a block diagram illustrating an embodiment of a virtual mesh model.

For example, by collecting scattered data from various devices within each coaxial cable node, a virtual mesh model could be generated, which may serve as a reference to track any network changes. By collecting information from all end CPE devices (e.g. cable modems (CMs), set top boxes, etc.) and node devices (e.g. remote physical layer (PHY) devices, called RPDs, or remote MAC and PHY layers devices, called RMDs), variations or changes of the coaxial cable plant may be detected through careful analysis for distributed information. FIG. 4 is a block diagram illustrating an embodiment of one such virtual mesh model.

The main characteristics of the data collection and network monitoring mechanisms provided herein (when applied to the remote PHY cable networks) include the following:

a) Active generation of a matrix of time-stamped trigger signals among CMs sharing the same cable medium;
b) Time-correlation analysis of the generated matrix signals to discover cable channel topology and RF conditions;

c) Detection of the presence of interference (from a CM or a signal generator);
d) Detection of the originating location of interference (from a CM or a signal generator); and
e) Detection and location of physical attacks against RPD or RMD;

These systems help operators to reduce the cable operator's repair complexity by providing early warning and remote diagnostics capability, and increase network security by quickly identifying any unexpected interference source.

Time-synchronized data is extremely useful for time varying interference sources, such as cellular LTE ingress noise. Interference signals vary with time, which is extremely difficult for a single point diagnostic tool to capture. Failures such as broken wire or bad shielding may also be detected via ripples in the spectrum carried on the wire.

By tracking information from each individual device, useful information could be found through correlations among the distributed information. In some implementations, a neural net or machine learning tool may be utilized to gradually form a useful algorithm for early diagnosis of the potential issues. This type of early diagnostics will save significant operator repair resources, and improve efficiency of repairs by providing more accurate location information and failure reasons.

Security Monitoring

The Security Monitoring functions provided by the security agents can include:
a) Monitoring authentication, e.g. monitoring and ensuring device authentication is not bypassed to prevent unauthorized users from gaining access to the network and services;
b) Monitoring authorization, e.g., monitoring the device as it achieves initial authorization, and periodically seeking reauthorization according to operator requirements;
c) Monitoring data privacy, e.g. monitoring the use of valid cryptographic algorithms and key lengths selected for data traffic encryption and key protection according to operator policies;
d) Monitoring CM secure provisioning, e.g. monitoring the provisioning process in DHCP, TFTP and others, to protect the device and the network from attacks and prevent service theft;
e) Monitoring secure boot and secure software download, e.g. monitoring and authenticating that the originator of any download code is a known and trusted source, monitoring that only verified codes are installed on the device, and that the device boots from a trusted hardware root, and the software chain of trust is enforced.

Application Example: Mitigation of Cable Modem (CM) and Remote PHY Device (RPD)/Converged Cable Access Platform (CCAP) Security Vulnerabilities In this section, a concrete example is provided that shows the application of the Coordinative Security to the mitigation of DOCSIS CM and RPD/CCAP security vulnerabilities. In some implementations, the CM and RPD functions may be provided via CM and node system-on-chips (SoCs), respectively. The RPD/CCAP network is illustrated in the block diagram of FIG. 5. The various portions of the network may have different vulnerabilities. For example, the IP non-accessible portion may be subject to RF-related disruption (e.g. noise interface) by a rogue cable modem or a signal generation device; and the CCAP core may be attacked by a rogue cable modem or a hacker behind a cable modem. The IP-accessible portion, including the RPD and CCAP core, are subject to common IP-initiated attacks by malicious actors via the Internet (e.g. denial of service attacks, etc.). However, authentication of the RPD and data protection between the RPD and CCAP Core may be provided as part of the R-PHY security requirements. Similarly, BPI+ protocols may provide for authentication and data protection to the cable modems.

Figure 5:
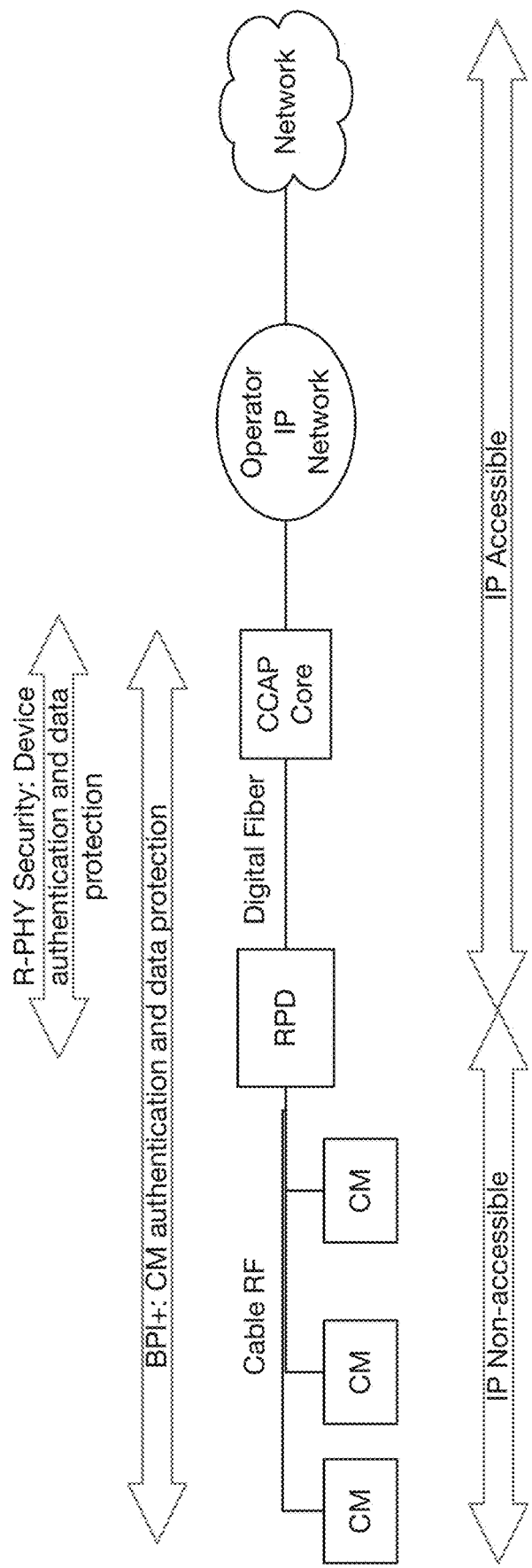
FIG. 5 is a block diagram illustrating an embodiment of a Remote PHY Device (RPD)/Converged Cable Access Platform (CCAP) network.

In FIG. 5, corresponding to the Coordinative Security network described above, the cable modems are leaf devices, the RPD is a Node Level 1 intermediate node device, and the CCAP Core is a Node Level 2 intermediate node device. An additional network entity (e.g. computing device, server, web service, etc.), not illustrated, would connect to the Network to perform the functions of the Security Coordination Portal.

Figure 6:
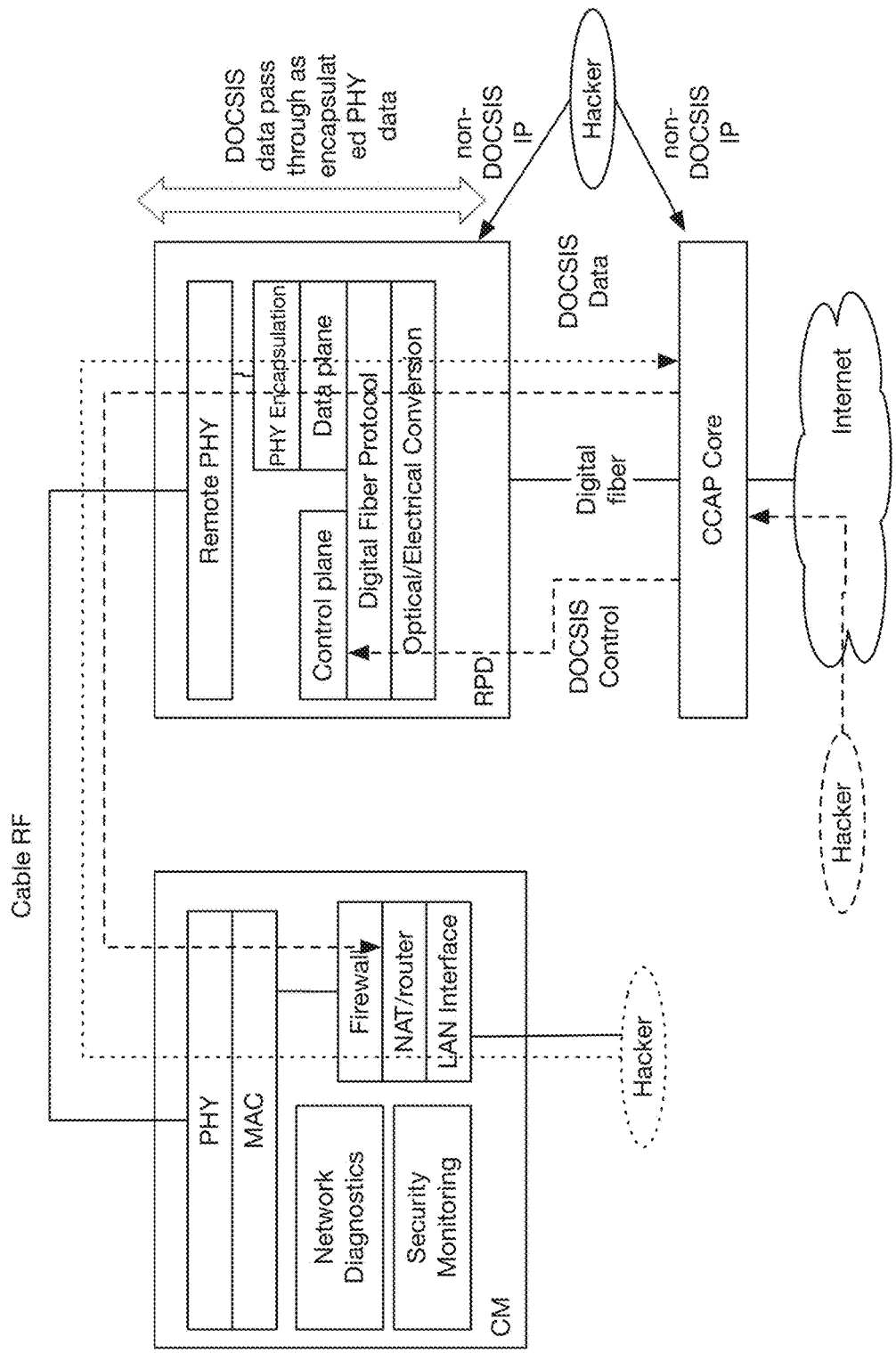
FIG. 6 is an illustration depicting potential attack vectors in an embodiment of a network environment.

FIG. 6 is an illustration depicting potential attack vectors in an embodiment of a network environment. These potential attack vectors and corresponding defenses include the following:

RPD is not exposed to IP-initiated attacks from the CM side, but is vulnerable to physical layer interference: a hacker may try to disrupt normal RPD operation by hijacking the CM or using a signal generator to inject noise/interference into the cable plant. However, there is no direct IP accessibility between CM and RPD, and the RPD does not process DOCSIS MAC layer information, and passes entire digital information to CCAP/server. Attacks using DOCSIS PHY bits are virtually impossible, especially if the DOCSIS data is scrambled by BPI+.

It is possible for the hacker behind the CM to initiate IP-related attacks against CCAP (similar to the cable modem termination system (CMTS) case). The hacker's data is processed by CCAP as IP packets, and accordingly, some typical IP-initiated attacks (e.g. DoS) are possible.

Hacker might initiate attacks against RPD Control Plane from the Internet/server side. The Control Plane between RPD and CCAP Core is extended and distributed, attacks against RPD via Control Plane would require the hacker to compromise the communication protocol between CCAP Core and RPD. However, since the hacker's DOCSIS data from the Internet passes through the Data Plane of RPD as encapsulated PHY data, the attacks against the Data Plane of RPD through DOCSIS data stream is virtually impossible Since the connection/network between RPD and CCAP is not physically secured, the hacker may launch IP attacks against RDP and CCAP within this segment of link through non-DOCSIS data paths.

Figure 7:
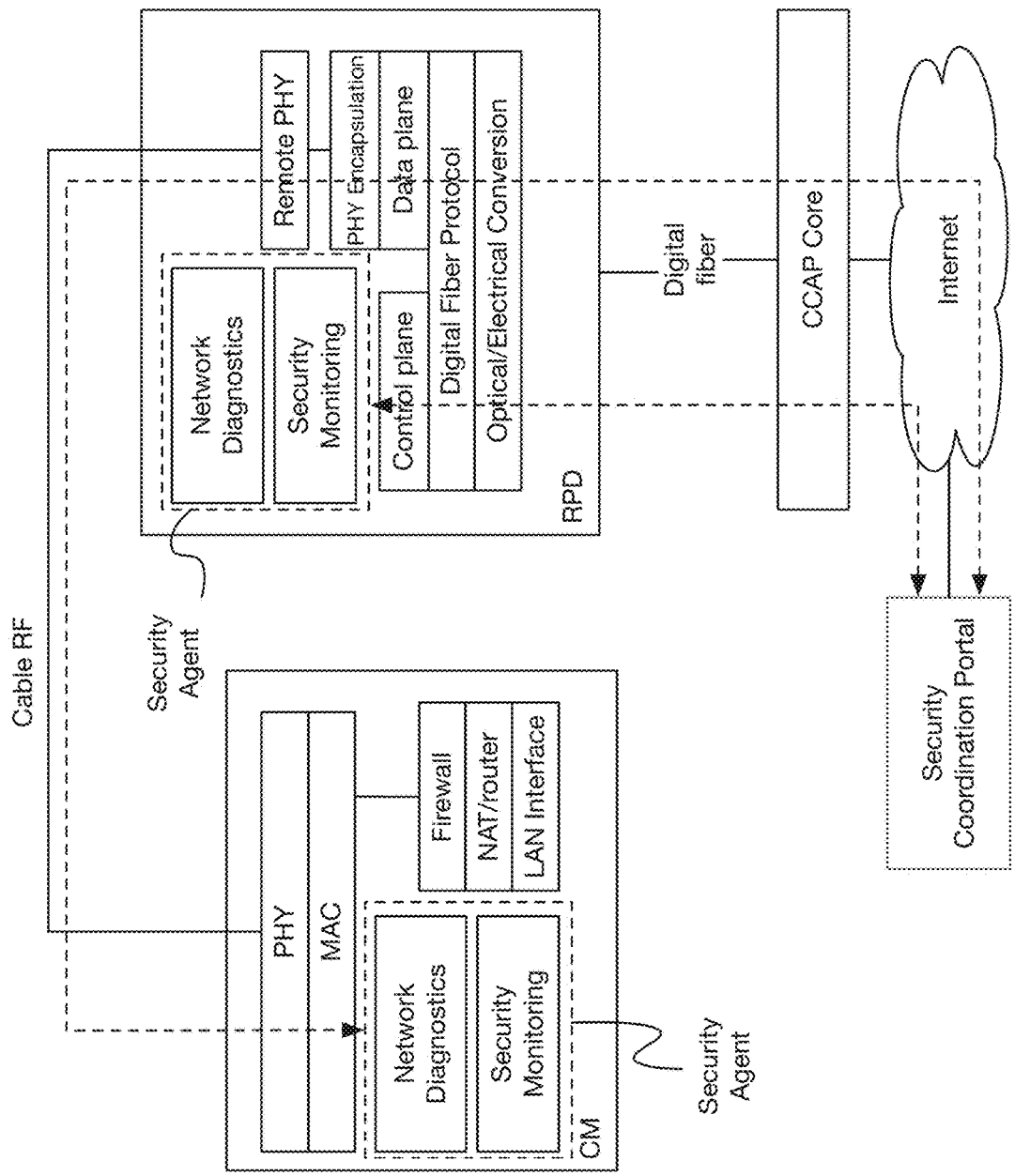
FIG. 7 is an illustration depicting a modified network environment incorporating security agents.

In order to address these security threats, the following mechanisms can be supported by the Security Agents in the cable modem and RPD, as shown in the illustration of FIG. 7.

CM Security Agent

The Security Agent (SA) in SoC can uniquely identify the modem and its associated devices (e.g. set top box, etc.) based on hardened attributes and root secrets. The modem SA also enforces the modem boot from image linked to CM silicon and enforces firmware and software images' authenticity and integrities during the boot. Furthermore, the modem itself may include a hardware accelerator for crypto operations with memory region protection. This provides extra CPU bandwidth available for data analytics and monitoring RPD Security Agent The RPD SoC device is uniquely programmed with harden root secrets. The device may include dedicated hardware for security resource management and a hardware accelerator for crypto operations. The RPD SA in SoC monitors all critical security operations, and in many implementations, restricts operations to be performed through the dedicated security hardware. The RPD SA also monitors booting of CMs from trusted images, and ensures firmware and software images' authenticity and integrities during the boot. RPD also provides a Trusted Execution Environment (TEE) for applications.

The illustration of FIG. 7 depicts a modified network environment incorporating security agents, according to one implementation, providing Coordinative Security to the DOCSIS RPD/CCAP network.

As shown, the security agents in the CM and RPD cannot directly communicate with each other (e.g. no IP connectivity between the devices). Instead, the cloud-based Security Coordination Portal acts a proxy and coordinator among all security agents in the CMs and RPDs (which have IP connectivity to the portal).

Thus, the systems and methods discussed herein provide coordinative security among network devices across multi-level networks. Shared cryptographic secrets among the network devices are used as the basis for mutual security authentication and peering among these devices. The cryptographic secrets are embedded in the SoCs for these devices or dynamically generated based on unique identification information and attributes of these SoC devices. The messages for authentication and peering can be communicated directly among the network devices or indirectly via a cloud security portal entity that acts as a messaging proxy. The mutual authentication and peering process can be carried out coordinately among the network devices and a cloud security portal in a one-to-one mesh relationship, or in a transitive layering relationship, where each network entity authenticates and peers with its direct subordinates in a multi-level network.

The cloud security portal establishes overall network-wide authentication and peering based on the authentication and peering status messages from all network devices. The network devices also implement security monitoring individually, and communicate the monitoring status information to the cloud security portal. The cloud security portal maintains overall network-wide diagnostics and security monitoring based on the status messages from all network devices, and coordinates any necessary mitigation of the network and security issues across the network.

For network diagnostics, active generation of a matrix of time-stamped trigger signals and response measurements among CMs sharing the same communications medium allows for a time-correlated analysis of the generated matrix signals and responses to discover network topology and channel conditions. Analysis of collected time-stamped matrix data allows detection and location of interference (from a network entity or an extraneous signal generator)

Network nodes provide security monitoring via monitoring authentication, e.g. monitoring and ensuring device authentication is not by-passed to prevent un-authorized users from gaining access to the network and services. Nodes also monitor authorization, e.g. monitor devices achieving initial authorization, and periodically seeking reauthorization as required by operational policies. Nodes also monitor data privacy, e.g. monitoring valid crypto algorithms and key lengths data traffic encryption and key protection as required by policies. Nodes also monitor secure provisioning of CM equipment, e.g. monitoring the provision process in DHCP, TFTP and others, to protect the device and the network from attacks and prevent service theft. Nodes also monitor secure boot and secure software download, e.g. monitoring and authenticating that the originator of any download code is a known and trusted source, and that only verified codes are installed on the device, and that the device boots from trusted hardware and software.

Thus, in some aspects, the present disclosure is directed to a system for coordinative security across multi-level networks. The system includes a security agent executed by a first device, in communication with a second device and a third device, each of the first device, second device, and third device in a multi-level network, the first device and second device having a first shared cryptographic secret and the first device and the third device having a second shared cryptographic secret. The security agent in the first device is configured to perform authentication with the second device via the first shared cryptographic secret and the third device via the second shared cryptographic secret.

In some implementations, the first device is the parent of the second device in the multi-level network; and the third device is the parent of the first device in the multi-level network.

In some implementations, the security agent of the first device communicates with the second device and third device via a fourth device acting as a proxy. In a further implementation, the first device and second device are connected via a first physical layer interface. In a still further implementation, an authentication request associated with the first shared cryptographic secret is communicated to the first device by the fourth device via a tunneled connection over the first physical layer interface, the fourth device forwarding the authentication request from the second device to the first device. In another further implementation, the security agent in the first device is further configured to provide an identification of successful authentication of the second device and third device to the fourth device. In yet another further implementation, the fourth device comprises a security portal. In still yet another further implementation, the security agent of the first device is configured to provide security measurement data to the fourth device, the fourth device correlating the security measurement data with the security measurement data from the second device and third device.

B. Systems and Methods for Cloud-Assisted Monitoring and Filtering with Multi-Layer Triggers Implementations of the architecture discussed above may also be used to provide secure monitoring and filtering of network communications across all tiers of the network. Specifically, in many implementations, the trusted chain architecture discussed above may be utilized to provide trusted monitoring and filtering over communications in the network. Cloud-assisted monitoring and filtering may be based on multi-layer triggers on data traffic collected from an IP device (e.g. DOCSIS cable modem, or remote-PHY node). A Control Client in the IP device may interact with a set of monitors that collect analytic information from various functional modules in the device and send such information to a cloud-based Control Server. The server in turn performs analysis of the received analytic data. The analysis may be related to the security and performance of the device or overall network. Based on the analysis results, the server is triggered to construct filtering rules to address the new conditions of the device or the network. The constructed rules are sent back to the Control Client, which then installs them to various checkpoints along the data paths in the device, monitoring and filtering the traffic that are traversing the device's interfaces.

Triggers are invoked for the construction of filtering rules by the Control Server. These triggers are based on data analysis methods of multiple logical layers, with increasing sophistication. These methods include:

Simple static configuration method
Classic statistics method
Modern machine-learning method The system allows for monitoring and filtering of the outbound traffic that enters the IP device from the LAN-facing interfaces (e.g. WiFi, Ethernet, MoCA). Furthermore, the system allows for monitoring and filtering of the inbound traffic from the WAN-facing interface (e.g. DOCSIS) or other interfaces (e.g. via JTAG, UART) exposed on the IP device.

In particular, the system allows chain-of-monitoring of network nodes and traffic pattern recognition of virus infection or other malware. In some implementations of chain-of-monitoring of network nodes, a cloud Control Server allocates monitoring and filtering functions among hierarchical network nodes (e.g. CCAPs, RPDs or RMD, and CMs) according to their individual security capabilities. The server may allocate more critical functions to the nodes with stronger security capabilities, and assign more control roles to these nodes when organizing the chain-of-monitoring among all monitoring nodes. The cloud Control Server may also collect virus-scanning log data or data regarding other malicious attacks from the user devices on the home network (e.g. PC). The server may apply this data to drive the labeling and training of data traffic statistics collected from the home network nodes (e.g. CM). The trained model may be used via a neural network or other machine learning architecture to detect viruses or other malware or any other undesirable traffic patterns.

Figure 8A:
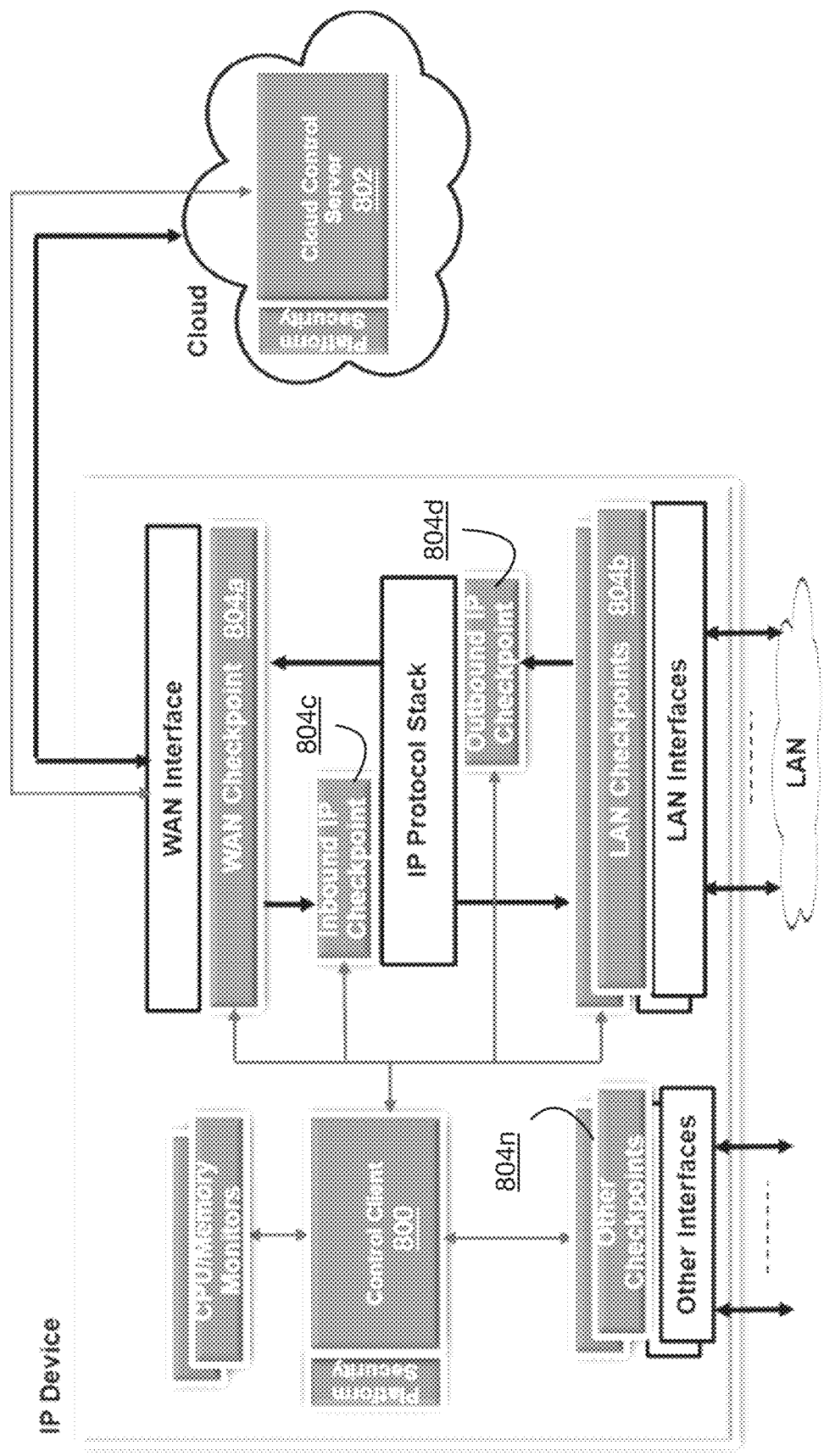
FIG. 8A is a block diagram of an embodiment of a system for cloud-assisted monitoring and filtering.

FIG. 8A is a block diagram of an embodiment of a system for cloud-assisted monitoring and filtering. A control client 800 may be executed by a computing device, such as a desktop computer, laptop computer, set top box, DOCSIS modem, or other such device. The control client 800 may comprise an application, server, service, daemon, routine, or other executable logic for monitoring security and monitoring operations, including receiving monitoring information from a cloud control server 802 or other device or via a user interface of the computing device, installing filtering rules or filters, and communicating with the cloud control server 802. The control client may be based on or anchored to the device's Platform Security mechanisms (e.g. trusted platform module, encryption hardware, etc.).

Checkpoints 804 may be installed at various places within the system, such as a WAN checkpoint 804a, LAN checkpoint 804b, inbound IP checkpoint 804c, outbound IP checkpoint 804d, and/or other checkpoints 804n, each checkpoint 804 corresponding to an interface and/or portion of a network stack. A checkpoint 804 may comprise an application, service, server, daemon, routine, or other executable logic for applying filtering rules or filters to inbound and/or outbound data (e.g. Ethernet packets, IP packets, or other types of data). The filters may contain data packet matching rules, as well as any actions (e.g. discard, forward, modify, etc.) to be taken when a match between a packet and a filter or rule is identified.

Figure 8B:
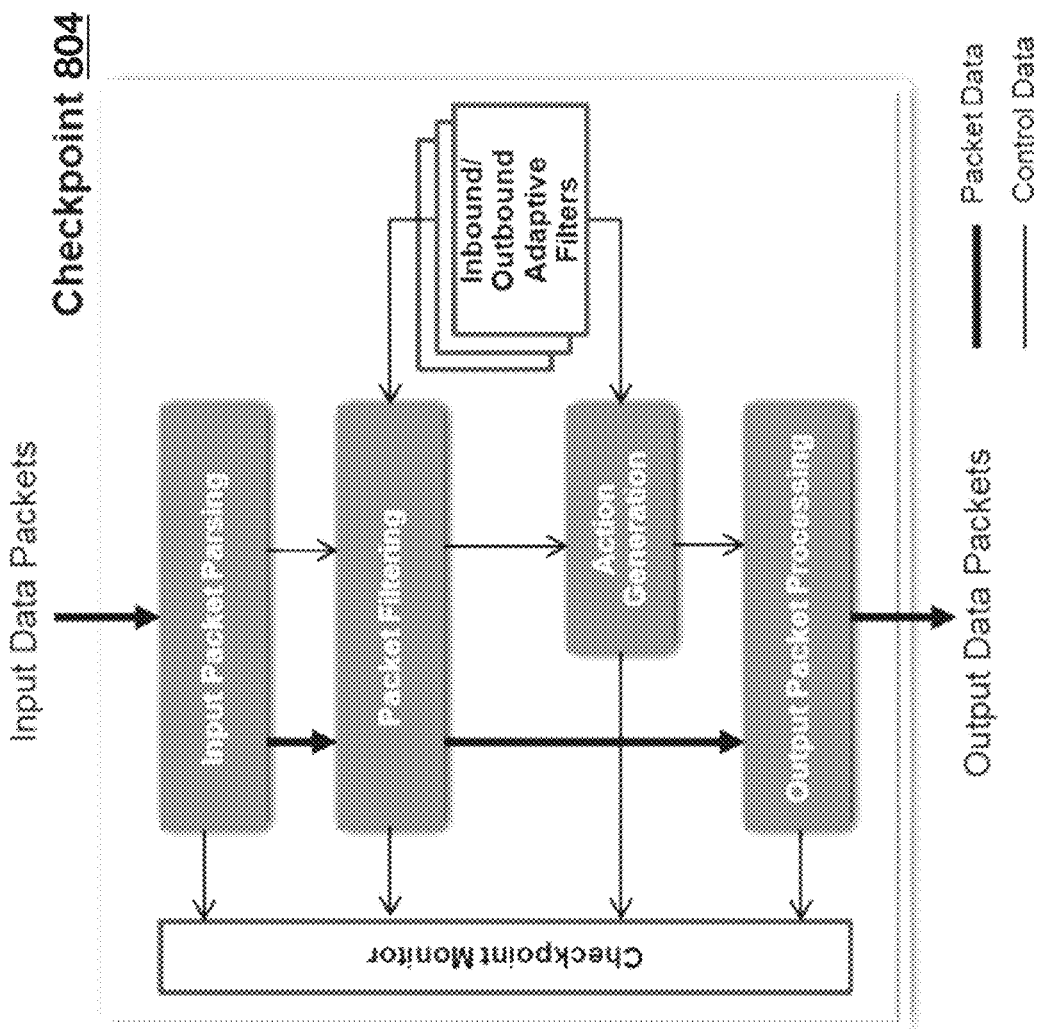
FIG. 8B is a block diagram of an implementation of a checkpoint for use by a system for cloud-assisted monitoring and filtering.

FIG. 8B is a block diagram of an implementation of a checkpoint 804 for use by a system for cloud-assisted monitoring and filtering. An input data packet may be parsed by an Input Packet Parsing module, which may comprise executable logic and/or hardware for parsing header fields of the packet. The Input Packet Parsing module may provide the extracted or copied parsed information to a Packet Filtering module, which may comprise executable logic and/or hardware for matching parsed information to one or more predetermined filters stored in memory of the device. The Packet Filtering module may attempt to match the parsing information with Inbound (if data is originated from the WAN side) or Outbound (if data is originated from the LAN side) Adaptive Filters. Filters may be applied to any portion of a packet including source or destination addresses and/or ports, payload types and/or sizes, VLAN identifiers, device identifiers, MAC addresses, or any other type and form of information. If a match between the packet and filter is established, corresponding action rules associated with the matched filters are extracted and passed to an Action Generation module, which may comprise executable logic and/or hardware for mapping the rules to executable actions for an Output Packet Processing module. The Output Packet Processing module may comprise executable logic and/or hardware for carrying out the corresponding actions on the output data packets. Furthermore, each checkpoint may include a corresponding checkpoint monitor for collecting analytic information about the status and operation of the checkpoint and the statistics of the input/output packets traversing the checkpoint (e.g. data throughput, packets received, packets transmitted, packets blocked, filters matched, etc.).

Returning to FIG. 8A, the IP device may also include one or more CPU/Memory monitors, which may comprise applications, servers, services, daemons, routines, or other executable logic for collecting data from computation resources such as a CPU, RAM, data storage device, GPU, co-processor, or other such device. The measured data, which may comprise performance characteristics, throughput, latency, usage, or any other such information, may be provided by the CPU/Memory monitors to a control client 800.

The cloud control server 802 may comprise a computing device in communication with the IP device as discussed above. In some implementations, the cloud control server 802 may comprise a security coordination portal as discussed above, and may communicate via tunneled communications via an RF interface or other such interface to a security agent on a client device. The cloud control server 802 may be responsible for the analysis of the received monitoring data from the Control Client 800 and the implementation of multi-layer triggers for the construction of filtering rules.

Figure 8C:
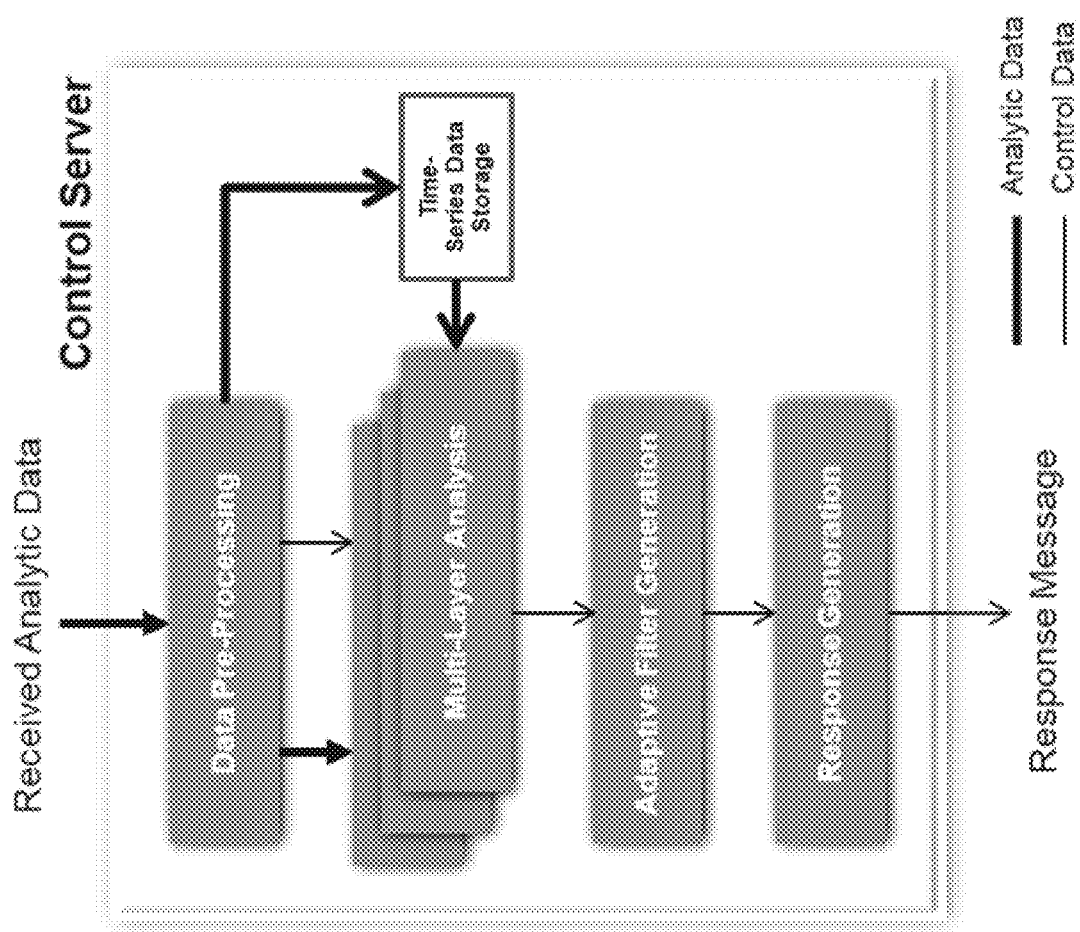
FIG. 8C is a block diagram of an implementation of a Cloud Control Server.

FIG. 8C is a block diagram of an implementation of a Cloud Control Server. The received analytic data from the Control Client 800 may be first processed or formatted by a Data Pre-Processing module, which may comprise an application, server, service, daemon, routine, or executable logic for filtering and/or aggregating analytic data. The filtered or pre-processed data may be provided to a Multi-Layer Analysis module for analysis and a Time-Series Data Storage device for long-term storage. The Multi-Layer Analysis module may comprise an application, server, service, daemon, routine, or executable logic for analyzing or correlating the incoming data to detect any abnormality or status change of the device, by applying analysis methods on multiple functional layers (e.g. network level throughput, system resource usage, etc.). Once detected, the corresponding triggers are generated and sent to the Adaptive Filter Generation module for construction of associated adaptive filters. The generated filters may be provided to the Control Client 800 for application on future packets.

Returning to FIG. 8A, multiple data checkpoints are setup along the data paths within the IP device. The data paths include the inbound and outbound IP traffic, the Ethernet traffic to and from the LAN, as well as the data movements across the miscellaneous interfaces such as JTAG, GPIO, UART, etc. The checkpoints 804 enforce checkpoint filters or adaptive filters provided by the cloud control server 802 as discussed above.

The filters contain data matching rules and specify any actions to be taken upon establishing rule matching or determining that a packet matches the data matching rules. The filter rules can be applied to the header fields at one or more layers of the OSI model (e.g. MAC, IP, UDP/TCP, HTTP, applications). The actions taken can include the common filtering actions such as forwarding or discarding of the matching IP packet and modification of the matching packet's header fields. In addition, the Cloud Control Server 802 can also adaptively specify the following actions as part of the filtering rules:

- Perform rate control to limit the data rate to be no more than a given dynamically configurable threshold. This action allows the interface and system data loading to be dynamically throttled, thus limiting the traffic injected into the network.
- Perform session admission control by accepting or rejecting new TCP session requests. This action provides a session-level data throttling, limiting the computational resources (CPU and memory) allocated for the processing of the new sessions.
- Enable/disable the interface. This action controls the enablement of the overall interface to regulate the data flows across the device.
- Send reports to the cloud control server. An event can be generated in a data checkpoint to send checkpoint data to the cloud Control Server via the Control Client.

Various functional modules (internal processing elements, interfaces and checkpoints) in the device are monitored by their corresponding monitors. The analytic information collected by these monitors can include the following dynamic data: Module status information, traffic statistics, activity/event logs, resource usage statistics, error counts, etc.

The monitored information is collected and aggregated by the Control Client, which can also perform pre-processing on the collected information. The Control Client sets conditions for information from the monitored functional modules; for instance, the conditions can be based on thresholds of the collected and pre-processed data values. If any pre-set condition is met, the Control Client invokes a communication session with the cloud Control Server. During the session, the Control Client sends the collected dynamic data to the Control Server; the data may contain the cached monitored parameters (short-term history).

Upon receiving the data, the Control Server performs analysis of the newly received information as well as appropriate information received and saved in the past (long-term history). The analysis is to detect any abnormality or operational status change of the device and to construct appropriate adaptive filters to address the detected abnormality or operational status change. The detection of abnormality or device operational status change constitutes a trigger. The triggers are created on three logical layers, with increasing complexity and sophistication. Each layer is represented by their associated analysis methods:

Layer 1: Static Configuration Methods. The triggers are statically provisioned, and their updating doesn't reflect and adapt to the dynamic status changes of the device.

Layer 2: Statistics Methods. The triggers are based on the traditional statistical analysis of the collected dynamic data from a given device or from all targeted devices, including the corresponding history data collected and saved over time.

Figure 8D:
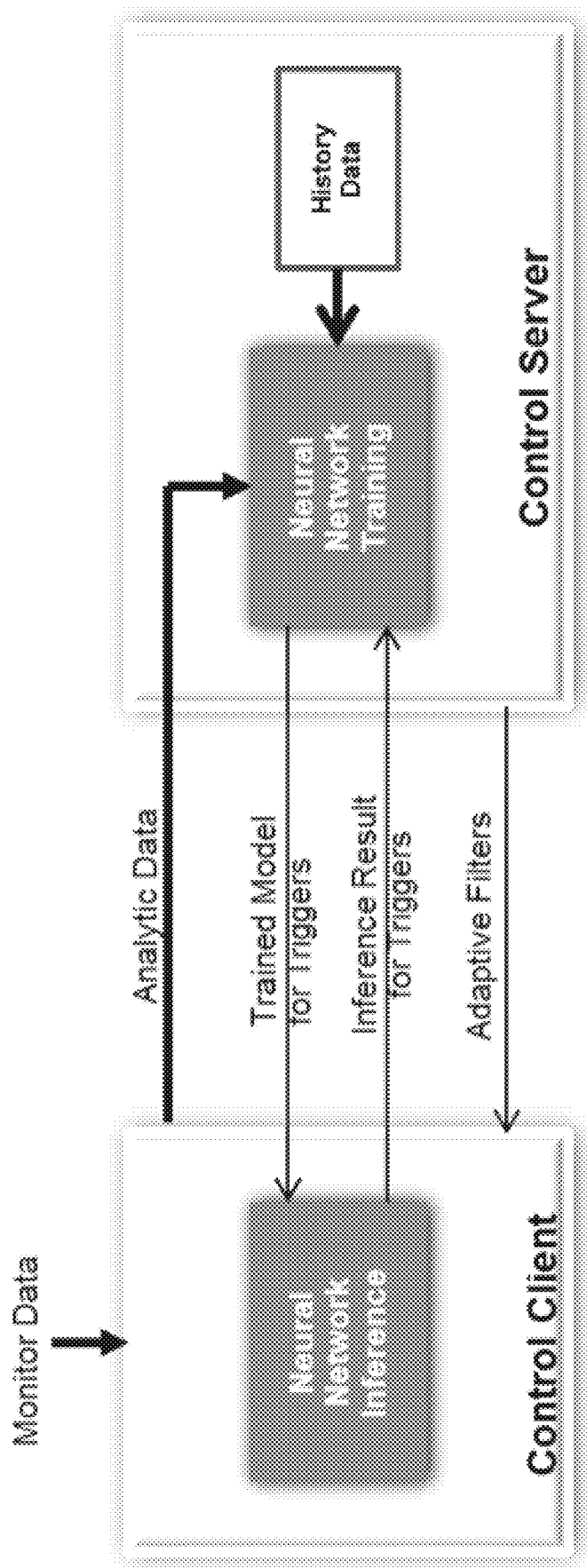
FIG. 8D is an illustration of communications flows between the control client and control server, according to some implementations.

Layer 3: Machine-Learning Methods. The triggers are resulted from the machine-learning algorithms (e.g. neural networks and expert systems) that operate on the collected dynamic data from a given device or from all targeted devices, including the corresponding history data collected and saved over time. For neural networks implementation, the training phase can be carried out in the Control Server, by applying the cloud computational resources on the received analytic data; the inference phase can be performed in the device by the Control Client. In this case, the inference result is sent to the Control Server for adaptive filter generation, as illustrated in FIG. 8D, which illustrates communications flows between the control client and control server, according to some implementations.

Upon completion of the multi-layer analysis, any constructed adaptive filters are sent back to the device's Control Client as discussed above, which may install and apply the filters on the corresponding checkpoints in the device. From then on, the device performs filtering based on the updated filter rules, until they are changed again by the Control Server.

All checkpoints are configured with their specific default filters when the device is initiated (power cycle or software/hardware reset). Furthermore, appropriate adaptive filters constructed by the Control Server may be made persistent cross the initializations (e.g. by saved in non-volatile memory and reloaded upon initialization).

Home networks may be particularly vulnerable to intrusion (e.g. via unprotected or weakly protected WiFi networks, or due to lack of active administration or patching of vulnerabilities). Furthermore, home clients may be compromised relatively easily. In either case, a malicious attacker can launch attacks against the IP device that is a gateway to the home network, potentially gaining access to the home and against the operator core networks and services. The systems and methods discussed herein provide a safe guard in face of such attacks:

- The LAN Checkpoints monitor all outbound traffic originated from the home network, and generate summaries of outbound traffic, including information such as source/destination MAC addresses of the outbound Ethernet/WiFi packets.
- The Outbound IP Checkpoint monitors all outbound traffic originated from the home network, and generates summaries of outbound traffic, including information for outbound IP packets: source/destination IP addresses, source/destination port numbers, protocol ID.
- Periodically or on-demand, the Control Client sends the summaries from the above-mentioned analytic data from checkpoints to the Control Server.
- The Control Server performs multi-layer analysis on the received traffic summary data to build a model for the normal traffic patterns. The model is used to detect any traffic patterns that deviate from the normal patterns. Upon detection, the Adaptive Filter Generation is trigged to construct the appropriate filters for the detected abnormality.

The received traffic summary data can be used to train a neural network to build a neural network model for the traffic patterns. The neural network model is sent to the Control Client, which uses it detect abnormal traffic patterns by performing neural network inference on the monitored data from the LAN Checkpoints and the Outbound IP Checkpoint. The Inference results are sent back to the Control Server to construct the corresponding adaptive filters.

The constructed adaptive filters are sent to the Control Client so that they can be installed at the LAN and Outbound IP Checkpoints.

The installed filters take actions to block packets that contribute to the abnormal traffic patterns.

Accordingly, normal and abnormal traffic may be detected even from new devices to the network. For example, upon installation of a new networked appliance or Internet-of-Things (IoT) device such as a home automation device, traffic from the device may be monitored and matched to filters. Even if the traffic is not initially recognized (e.g. for a very new device), over time, network traffic from such devices in a plurality of client locations may be aggregated and a neural network trained to recognize such traffic as normal, and adaptive filters may be generated. Accordingly, if the device is compromised at some point in the future, the system may be able to quickly recognize abnormal traffic even without manual configuration or programming. This may allow for very quick detection and mitigation of zero-day exploits or other new malicious activity.

The Control Client may collect statistics about one or more of the following monitored parameters: a) CPU loading, b) RAM usage, c) Number of data sessions identified by a 5-tuple (source/destination IP addresses, source/destination port numbers, protocol). The crossing of the upper bound threshold by any of these parameters may trigger a contact with the Control Server. The contact message to the Control Server may contain the cached history of monitored parameters including one or more of those discussed above. The Control Server may analyze the received statistics and determine potential actions. For instance, if the substantial elevation of CPU loading or RAM usage is accompanied by the spike in the number of data sessions, it can be a strong indicator that a denial of service (DoS) attack is underway. To mitigate the attack, the Control Server specifies the necessary adaptive filters for the Inbound or Outbound IP Checkpoint (depending on the attack is from WAN or LAN): e.g. "Deny any new sessions sourced from non-operator address space" and/or "Drop suspicious active data sessions sourced from non-operator address space". The Control Server may send the new filters to the device, and the Control Client may install the filters at corresponding checkpoints along the data path. Accordingly, inbound and outbound traffic is subjected to the updated filtering rules.

Similarly, the crossing of the lower bound thresholds by one or more of the three mentioned parameters may trigger a new contact with the Control Server, which in turn may instruct the device to remove the earlier filters, if it determines that the DoS attack risk has been reduced according to the new statistics. This may reduce processing requirements by the monitoring and filtering process, reduce memory requirements in instances in which filters are no longer needed, and allow processing and memory resources to be utilized for other functions, potentially speeding up response times for legitimate traffic.

Figure 8E:
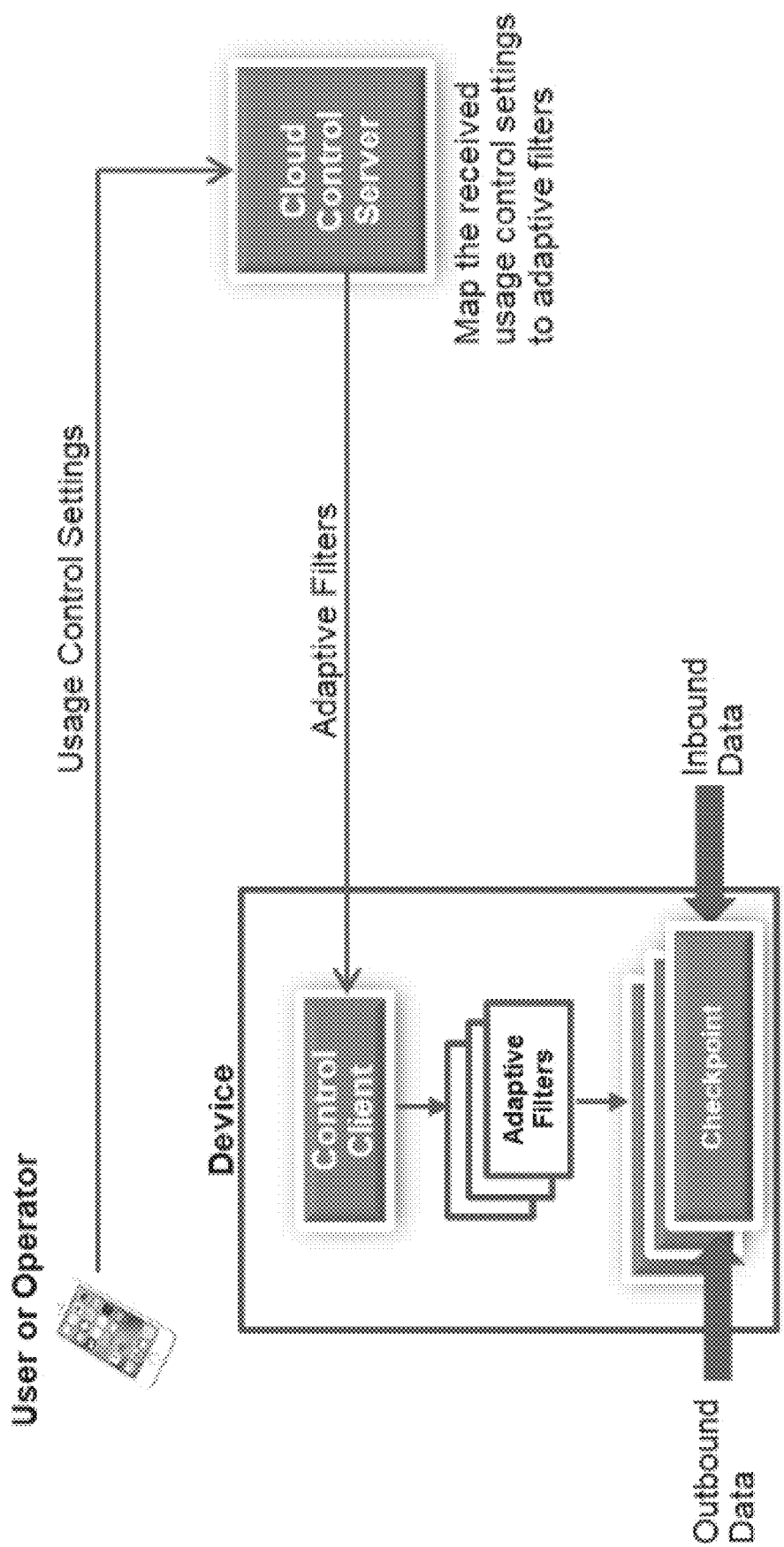
FIG. 8E is an illustration of configuring usage control in some implementations.

FIG. 8E is an illustration of configuring usage control in some implementations. A user or operator may log into the Control Server (either directly or via an operator proxy portal), and configure the desired usage control settings: e.g. "no accessing a social media site after 11 pm for CPE client X"; providing a list of blacklisted or whitelisted sites or domains per CPE device for a given time window; etc. The Control Server may map the received usage control settings to filter rules: "Block access to social media domains example.com, example.net after 11 pm for MAC address X", block/allow domain names xyz for MAC address X during time T1 to T2, etc. The Control Server may send the constructed adaptive filters to the device. The Control Client in the device installs the received filters at corresponding checkpoints along the data path. Inbound/outbound traffic is subjected to the updated filtering rules along the data path. The filters for the usage control are changed upon subsequent user or operator configuration.

A chain-of-monitoring may be used to provide scalability and efficiency in large deployments. The Control Server may collect information about device security capabilities from all monitoring devices in the network via their Control Agents. The security capabilities may include hardware/software security processing profiles, supported crypto suites, etc.

The server may allocate monitoring and filtering tasks among hierarchical network nodes (e.g. CCAPs, RPDs or RMD, and CMs) according to their individual security capabilities. For example, in some implementations, the server may allocate more critical tasks to the nodes with stronger security capabilities; or assign more control roles to the nodes with stronger security capabilities, when organizing the hierarchical chain-of-monitoring among all monitoring nodes. Depending on the distribution of device security capabilities, the hierarchy for chain-of-monitoring may be different from that of the physical network.

Figure 8F:
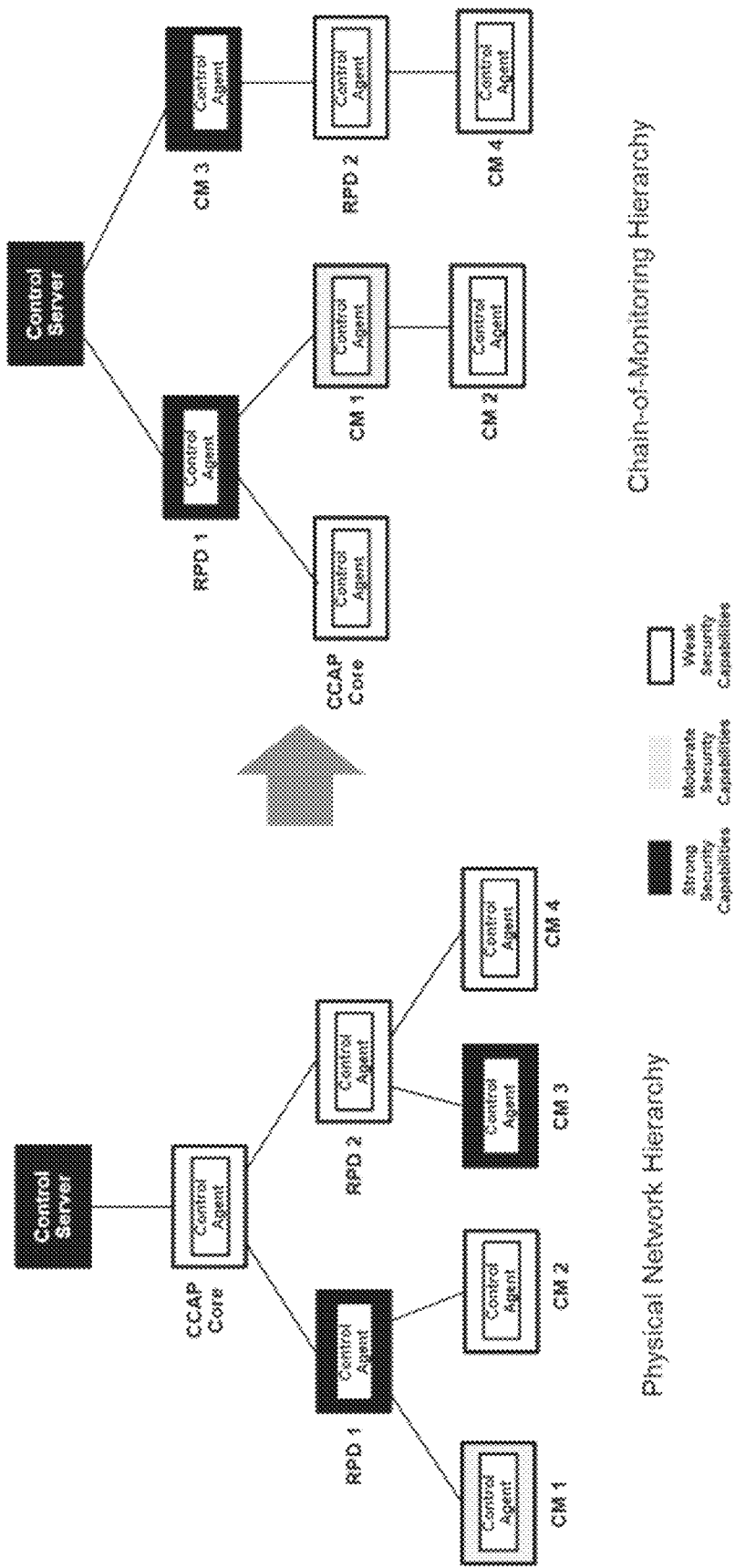
FIG. 8F is an illustration of a hierarchy for scalable chain-of-monitoring, according to some implementations.

FIG. 8F illustrates the mapping by the Control Server from a physical network hierarchy to a chain-of-monitoring hierarchy, using a hypothetical DOCSIS cable network as an example. The cable network may comprise a CCAP Core, two RPD's (Remote-PHY Device), and 4 CM's (cable modems), where the levels of security capabilities of these devices are shown. The different levels of security capabilities may be resulted from the specific software-on-chip (SoC) used in these devices. Different SoC's may possess varying security hardware and software processing functions, for example. As shown, the physical network hierarchy may be distinct from the chain-of-monitoring hierarchy, which may instead focus on security capabilities of each device. Thus, for example, CM3 may be an end leaf node according to a physical deployment, but have strong security capabilities and thus may be a primary branch node according to a chain-of-monitoring logical deployment. The CM3 may be leveraged to provide security monitoring and functionality for its child devices in the chain-of-monitoring hierarchy, regardless of its location in the physical deployment.

As discussed above, in some implementations, the system may detect malicious attackers or software via recognition of abnormal traffic patterns. In some implementations, the Control Server may collect virus-scanning log data from a user devices on the home network (e.g. PC). The server applies the collected virus-scanning log data to label the data traffic statistics collected from the home network devices (e.g. CM) that are connected to the user devices. The server performs the training of a machine-learning model with the collected traffic data and associated labels. The trained model may be sent to the Control Agents of the monitoring devices. The trained model in the monitoring devices is used for an inference operation of the machine learning system for the detection of viruses or other malicious software or exploits and any undesirable traffic patterns, by using the local data traffic statistics as input datasets.

Accordingly, these systems provide for monitoring and data traffic filtering in an IP device controlled via a Control Client, and assisted by a cloud Control Server. Security checkpoints are setup along the IP data paths within the device, with each checkpoint enforcing adaptive filters on its input data. The Control Client receives device analytic data from data monitors associated with various device modules. The data includes, among others, module status information (e.g. enable/disable, operations statistics, etc.); traffic statistics (e.g. data rate, error rate, data session source/destination addresses, data protocols, etc.); and resource usage statistics (e.g. CPU loading, active processes, memory usage and interface loading). The Control Client sends the collected dynamic analytics information to the Control Server upon occurrence of the pre-defined events. The examples of the events include: the monitored parameters crossing pre-defined upper and lower thresholds; and/or the neural network inference results indicating a predefined classification or deviating from a normal traffic flow. Upon receiving the analytic data from the Control Client, the Control Server may perform an analysis of the newly received information as well as analytic information received in the past. The analysis may detect any abnormality or operational status change of device and construct appropriate adaptive filters, which are sent back to the Control Client for enforcement at corresponding checkpoints. At the checkpoints, the adaptive filters implement the packet or interface-state matching against a set of matching rules, with the matched data packets or interface being subject to filtering actions.

Besides covering common filtering actions on the data packets (e.g. discard/forward the packet), the filtering actions can also cover the following: perform rate control to limit the data rate to be no more than a given dynamically configurable threshold (this action allows the interface and system data loading to be dynamically throttled, thus limiting the traffic injected into the network); perform session admission control by accepting or rejecting new TCP session requests (this action provides a session-level data throttling, limiting the computational resources (CPU and memory) allocated for the processing of the new sessions); enabling/disabling the interface (this action controls the enablement of the overall interface to regulate the data flows across the device); or sending reports to the cloud (an event can be generated in a data checkpoint to send checkpoint data to the cloud Control Server via the Control Client).

The detection of abnormality or device operational status change constitutes a trigger. The triggers are created on three logical layers, with increasing sophistication. Each layer is represented by their associated analysis methods:

Static Configuration Methods. The triggers are statically provisioned, and their updating doesn't reflect and adapt to the dynamic status changes of the device;

Statistics Methods. The triggers are based on the traditional statistical analysis of the collected dynamic data from a given device or from all targeted devices, including the corresponding history data collected and saved over time; and Machine-Learning Methods. The triggers are resulted from the machine-learning algorithms (e.g. neural networks and expert systems) that operate on the collected dynamic data from a given device or from all targeted devices, including the corresponding history data collected and saved over time.

For a neural network-based implementation, the training phase can be carried out in the Control Server, by applying the cloud computational resources on the received analytic data; the inference phase can be performed in the device by the Control Client. In this case, the inference result is sent to the Control Server for adaptive filter generation.

To ensure secure operation, the Control Client and the Control Server perform mutual authentication and data encryption, based on the platform security mechanisms on both sides.

Chain-of-Monitoring may be applied across a plurality of network nodes to provide scalability and efficiency. In such implementations, the Control Server may collect information about device security capabilities from all monitoring devices in the network via their Control Agents. The security capabilities include hardware/software security processing profiles, supported crypto suites, etc. The server allocates monitoring and filtering tasks among hierarchical network nodes (e.g. CCAPs, RPDs, and CMs) according to their individual security capabilities. In particular, it allocates more critical tasks to the nodes with stronger security capabilities; and assigns more control roles to such nodes when organizing the hierarchical chain-of-monitoring among all monitoring nodes.

Traffic patterns may be monitored and malicious traffic identified based on monitoring information received from the devices. Specifically, in some implementations, the Control Server collects the virus-scanning log data from user devices on the home network (e.g. PC). The server applies the collected virus-scanning log data to label the data traffic statistics collected from the home network devices (e.g. CM) that are connected to the user devices. The server performs the training of a machine-learning model with the traffic data and associated labels. The trained model is sent to the Control Agents of the monitoring devices. The trained model in the monitoring device is used for the inference operation of the machine learning for the detection of virus and any undesirable traffic patterns, by using the local data traffic statistics as input datasets.

Figure 9:
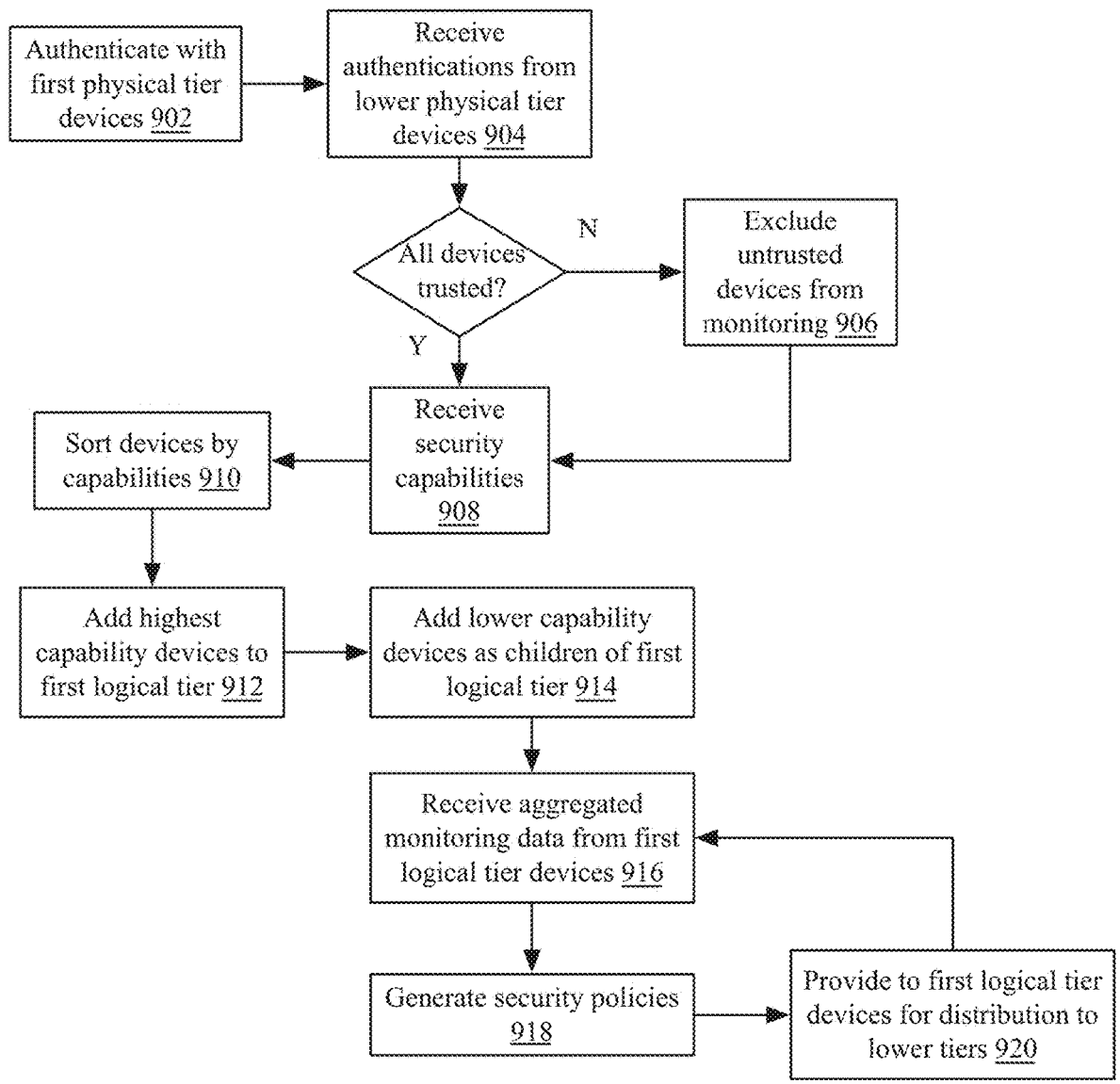
FIG. 9 is a flow chart of an implementation of a method for cloud-assisted monitoring and filtering using scalable chain-of-monitoring and coordinative security.

FIG. 9 is a flow chart of an implementation of a method for cloud-assisted monitoring and filtering using scalable chain-of-monitoring and coordinative security. As discussed above in connection with section A, the system may establish a trusted chain of devices via a hierarchy of shared cryptographic secrets. At step 902, the control server may authenticate devices physically connected to the control server in a first tier of a physical topology. The authentication may be via an exchange of information associated with a shared cryptographic secret, such as exchange of encrypted identifiers that are decryptable via the shared cryptographic secret. At step 904, the control server may receive, from one or more of the first tier devices, identifications of authentications from devices of lower tiers of the physical hierarchy (e.g. devices connected to one of the first tier devices). The authentications of said lower tier devices and first tier devices may be performed in a similar manner to the authentication of the first tier devices at step 902. This process may be repeated for each lower tier of devices.

If any devices are untrusted (e.g. the control server does not receive an identification of successful authentication for any device), then at step 906, the untrusted device(s) may be excluded from monitoring. Other security mitigation steps may be taken, including filtering communications to and from the untrusted device(s), disabling the untrusted device(s), or otherwise preventing the untrusted device(s) from access to the system.

At step 908, the control server may receive security capabilities from each device. The security capabilities may be communicated via an IP network as discussed above. In many implementations, as discussed above, devices may have different security capabilities (for example, older devices may have lower capability processors, less memory, etc.). The devices may be sorted by capability at step 910. In some implementations, the devices may be sorted directly, while in other implementations, the devices may be sorted into tiers based on predetermined thresholds. For example, devices having memory greater than a first threshold may be placed in a first tier; devices having memory less than the first threshold but greater than a second threshold may be placed in a second tier; and devices having memory less than the second threshold may be placed in a third tier; etc. The same sorting may apply to processor capability, the presence of cryptographic hardware on the device, etc. In some implementations, each characteristic or capability of a device may be given a score, and the aggregate scores may be compared to thresholds to sort the devices. The scores may be weighted or given different point totals depending on capability (for example, the presence of a TPM module on a device may cause it to be given a high score; or a processor speed may be rated more highly than an amount of free memory on a device).

The devices may be added to tiers of a logical security hierarchy at steps 912-914, with highest capability devices added to the first tier; with lower capability devices added as children in lower tiers. In implementations with three tiers, devices having moderate capability may be added as children of the first tier, with devices having low capability added as children of the second tier. The devices of lower tiers may be distributed among parent nodes via any suitable means, such as a round robin or balanced distribution, or an unbalanced distribution (e.g. where some devices identified as having high capability have even higher capability than other devices having high capability; such higher capability devices may be allocated additional child nodes).

At step 916, the control server may receive aggregated monitoring data from each of the first logical tier devices, the monitoring data including data from each of said first logical tier devices' child nodes, as well as any child nodes of said child nodes. Each device in the hierarchy may collect and aggregate monitoring data from its children and forward the aggregated monitoring data and its own local monitoring data to a parent node. Through this iterative process, the control server may receive aggregated monitoring data from all of the nodes in a highly efficient and scalable fashion, capable of supporting thousands or even millions of devices.

At step 918, the control server may generate security policies to apply at each tier based on the aggregated monitoring data. In some implementations, the control server may use a machine learning system trained on prior receive aggregated monitoring data to generate the security policies. Such implementations may be utilized to automatically detect abnormal or possibly malicious behavior. Security policies may be applied as discussed above, and may include filters for matching packets, and associated rules including forwarding or blocking rules, encryption rules, enabling or disabling devices, etc. At step 920, the security policies may be provided to the first tier devices for local application and/or forwarding to devices at lower tiers via the logical hierarchy. The security policies may include an identifier of the device or devices for which the policy is designated, such that each parent device in the hierarchy may determine whether to forward the policy to a child device in the hierarchy.

Accordingly, once a chain of trust is established, monitoring may be provided via a chain-of-monitoring that may comprise a different logical hierarchy than a physical hierarchy or topology of the devices, responsive to capabilities of each device.

Thus, in some aspects, the present disclosure is directed to a method for hierarchical chain-of-monitoring of network devices. The method includes receiving, by a control server device from each of a plurality of additional devices deployed in a physical multi-tier hierarchy, an identification of security capabilities of each of the plurality of additional devices, wherein a first additional device at a first level of the physical multi-tier hierarchy forwards an identification of security capabilities from a second additional device at a second, lower level of the physical multi-tier hierarchy. The method also includes determining, by the control server device, that a security capability of the second additional device exceeds a security capability of the first additional device. The method also includes responsive to the determination, assigning the second additional device to a first level of a logical multi-tier hierarchy and the first additional device to a second, lower level of the logical multi-tier hierarchy, by the control server device, wherein the first additional device is a child of the second additional device in the logical multi-tier hierarchy. The second additional device applies one or more security policies to data communicated with the first additional device by a third device, responsive to the first additional device being a child of the second additional device in the logical multi-tier hierarchy.

In some implementations, the security policies comprise applying filtering policies to packets transmitted to or from the first additional device. In a further implementation, the filtering policies are generated by a machine learning system of the control server device trained from a historical record of data communicated by the plurality of additional devices.

In some implementations, the second additional device is a child of the first additional device in the physical multi-tier hierarchy. In a further implementation, the second additional device receives an identification of packets transmitted to or from the first additional device, from the first additional device; and wherein the second additional device directs the first additional device to discard a subset of the packets transmitted to or from the first additional device corresponding to a filtering policy. In a still further implementation, the second additional device directs the first additional device to discard the subset of the packets responsive to the packets transmitted to or from the first additional device exceeding a threshold corresponding to the filtering policy.

In some implementations, the second additional device is not a child of the first additional device in the physical multi-tier hierarchy. In a further implementation, the second additional device receives, via a first physical layer interface of the second additional device, the identification of packets transmitted to or from the first additional device via a second physical layer interface of the first additional device, the first physical interface not in communication with the second physical layer interface. In a still further implementation, the method includes receiving, by the control server device from the first additional device, the identification of packets transmitted to or from the first additional device; and forwarding, by the control server device to the second additional device via the first physical layer interface, the received identification. In another further implementation, the method includes authenticating, by the control server device, the first additional device using a first shared cryptographic secret of the control server device and the first additional device. In a still further implementation, the method includes authenticating, by the control server device, a third additional device at the first level of the physical multi-tier hierarchy using a second shared cryptographic secret of the control server device and the third additional device, wherein the second additional device is a child of the third additional device in the physical multi-tier hierarchy. In a yet still further implementation, the method includes receiving, by the control server device from the third additional device, an indication of authentication of the second additional device, transmitted by the third additional device responsive to the third additional device authenticating the second additional device via a third shared cryptographic secret of the second additional device and the third additional device.

In another aspect, the present disclosure is directed to a system for hierarchical chain-of-monitoring of network devices. The system includes a control server device in communication with each of a plurality of additional devices deployed in a physical multi-tier hierarchy. The control server device is configured to receive an identification of security capabilities of each of the plurality of additional devices, wherein a first additional device at a first level of the physical multi-tier hierarchy forwards an identification of security capabilities from a second additional device at a second, lower level of the physical multi-tier hierarchy. The control server device is further configured to determine that a security capability of the second additional device exceeds a security capability of the first additional device. The control server device is further configured to, responsive to the determination, assign the second additional device to a first level of a logical multi-tier hierarchy and the first additional device to a second, lower level of the logical multi-tier hierarchy, wherein the first additional device is a child of the second additional device in the logical multi-tier hierarchy. The second additional device applies one or more security policies to data communicated with the first additional device by a third device, responsive to the first additional device being a child of the second additional device in the logical multi-tier hierarchy.

In some implementations, the security policies comprise applying filtering policies to packets transmitted to or from the first additional device. In a further implementation, the filtering policies are generated by a machine learning system of the control server device trained from a historical record of data communicated by the plurality of additional devices.

In some implementations, the second additional device is a child of the first additional device in the physical multi-tier hierarchy. In a further implementation, the second additional device receives an identification of packets transmitted to or from the first additional device, from the first additional device; and wherein the second additional device directs the first additional device to discard a subset of the packets transmitted to or from the first additional device corresponding to a filtering policy. In a still further implementation, the second additional device directs the first additional device to discard the subset of the packets responsive to the packets transmitted to or from the first additional device exceeding a threshold corresponding to the filtering policy.

In some implementations, the second additional device is not a child of the first additional device in the physical multi-tier hierarchy. In a further implementation, the second additional device receives, via a first physical layer interface of the second additional device, the identification of packets transmitted to or from the first additional device via a second physical layer interface of the first additional device, the first physical interface not in communication with the second physical layer interface. In a still further implementation, the control server device is further configured to receive from the first additional device the identification of packets transmitted to or from the first additional device; and forwarding, by the control server device to the second additional device via the first physical layer interface, the received identification. In another further implementation, the control server device is further configured to authenticate the first additional device using a first shared cryptographic secret of the control server device and the first additional device. In a still further implementation, the control server device is further configured to authenticate a third additional device at the first level of the physical multi-tier hierarchy using a second shared cryptographic secret of the control server device and the third additional device, wherein the second additional device is a child of the third additional device in the physical multi-tier hierarchy. In a yet still further implementation, the control server device is further configured to receive from the third additional device, an indication of authentication of the second additional device, transmitted by the third additional device responsive to the third additional device authenticating the second additional device via a third shared cryptographic secret of the second additional device and the third additional device.

C. Computing and Network Environment

Figure 10A:
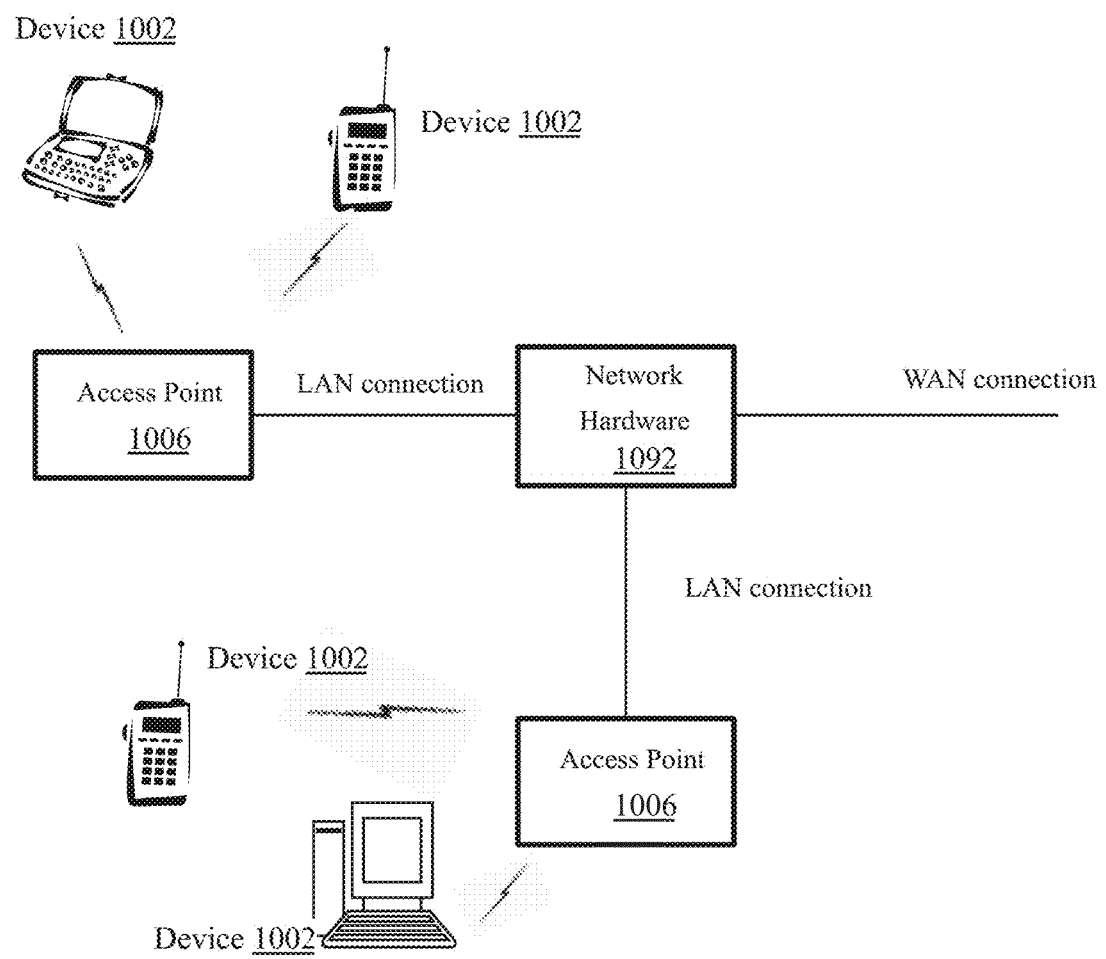
FIG. 10A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 10A, an embodiment of a network environment is depicted. In brief overview, the network environment includes a wireless communication system that includes one or more access points 1006, one or more wireless communication devices 1002 and a network hardware component 1092. The wireless communication devices 1002 may for example include laptop computers 1002, tablets 1002, personal computers 1002 and/or cellular telephone devices 1002. The details of an embodiment of each wireless communication device and/or access point are described in greater detail with reference to FIGS. 10B and 10C. The network environment can be an ad hoc network environment, an infrastructure wireless network environment, a subnet environment, etc. in one embodiment The access points (APs) 1006 may be operably coupled to the network hardware 1092 via local area network connections. The network hardware 1092, which may include a router, gateway, switch, bridge, modem, system controller, appliance, etc., may provide a local area network connection for the communication system. Each of the access points 1006 may have an associated antenna or an antenna array to communicate with the wireless communication devices 1002 in its area. The wireless communication devices 1002 may register with a particular access point 1006 to receive services from the communication system (e.g., via a SU-MIMO or MU-MIMO configuration). For direct connections (e.g., point-to-point communications), some wireless communication devices 1002 may communicate directly via an allocated channel and communications protocol. Some of the wireless communication devices 1002 may be mobile or relatively static with respect to the access point 1006.

In some embodiments an access point 1006 includes a device or module (including a combination of hardware and software) that allows wireless communication devices 1002 to connect to a wired network using Wi-Fi, or other standards. An access point 1006 may sometimes be referred to as an wireless access point (WAP). An access point 1006 may be configured, designed and/or built for operating in a wireless local area network (WLAN). An access point 1006 may connect to a router (e.g., via a wired network) as a standalone device in some embodiments. In other embodiments, an access point can be a component of a router. An access point 1006 can provide multiple devices 1002 access to a network. An access point 1006 may, for example, connect to a wired Ethernet connection and provide wireless connections using radio frequency links for other devices 1002 to utilize that wired connection. An access point 1006 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 1006 may be used for (e.g., in-home or in-building) wireless networks (e.g., IEEE 802.11, Bluetooth, ZigBee, any other type of radio frequency based network protocol and/or variations thereof). Each of the wireless communication devices 1002 may include a built-in radio and/or is coupled to a radio. Such wireless communication devices 1002 and/or access points 1006 may operate in accordance with the various aspects of the disclosure as presented herein to enhance performance, reduce costs and/or size, and/or enhance broadband applications. Each wireless communication devices 1002 may have the capacity to function as a client node seeking access to resources (e.g., data, and connection to networked nodes such as servers) via one or more access points 1006.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 10B:
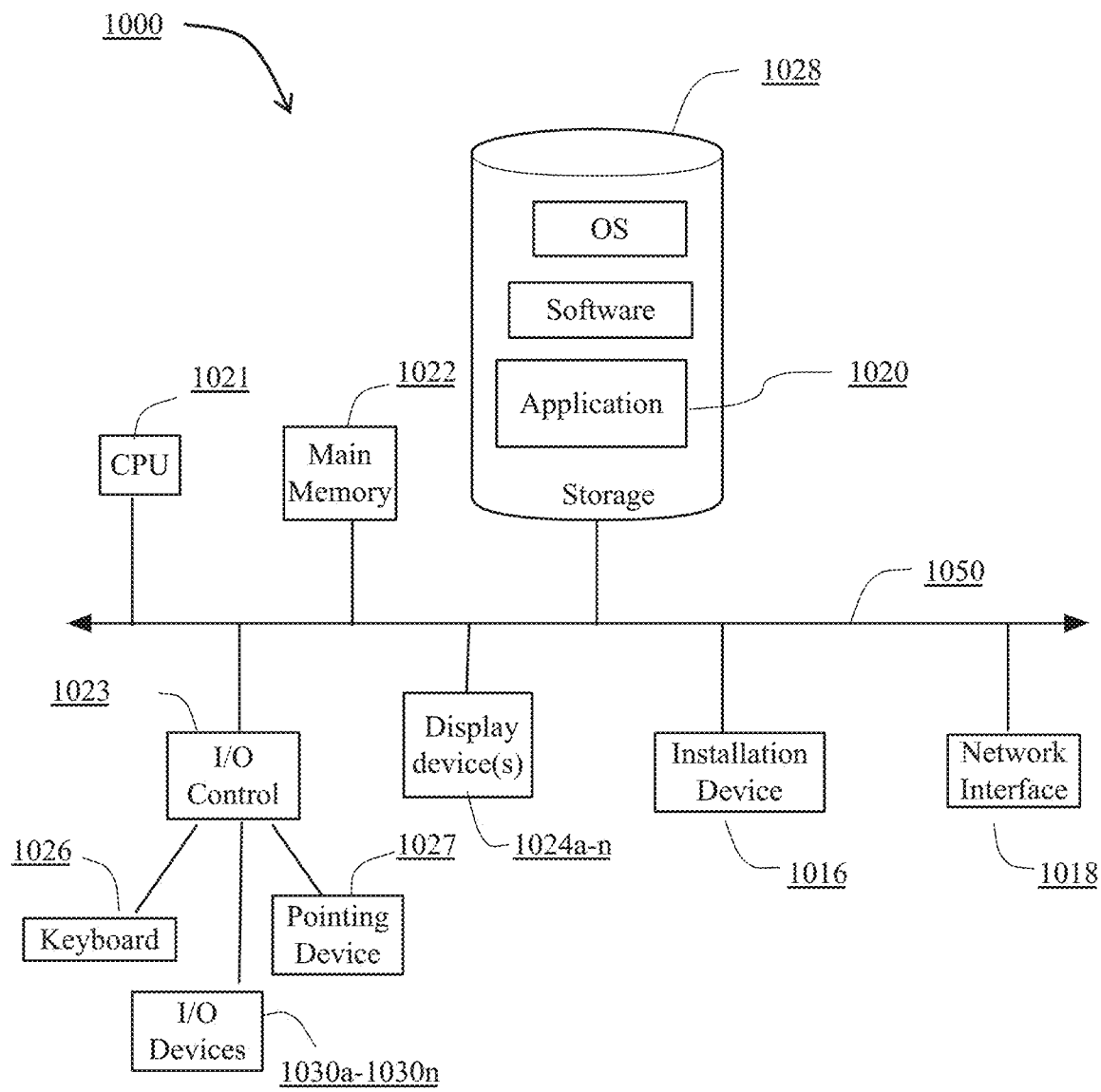
FIGS. 10B and 10C are block diagrams depicting embodiments of computing devices useful in connection with the methods and systems described herein.
Figure 10C:
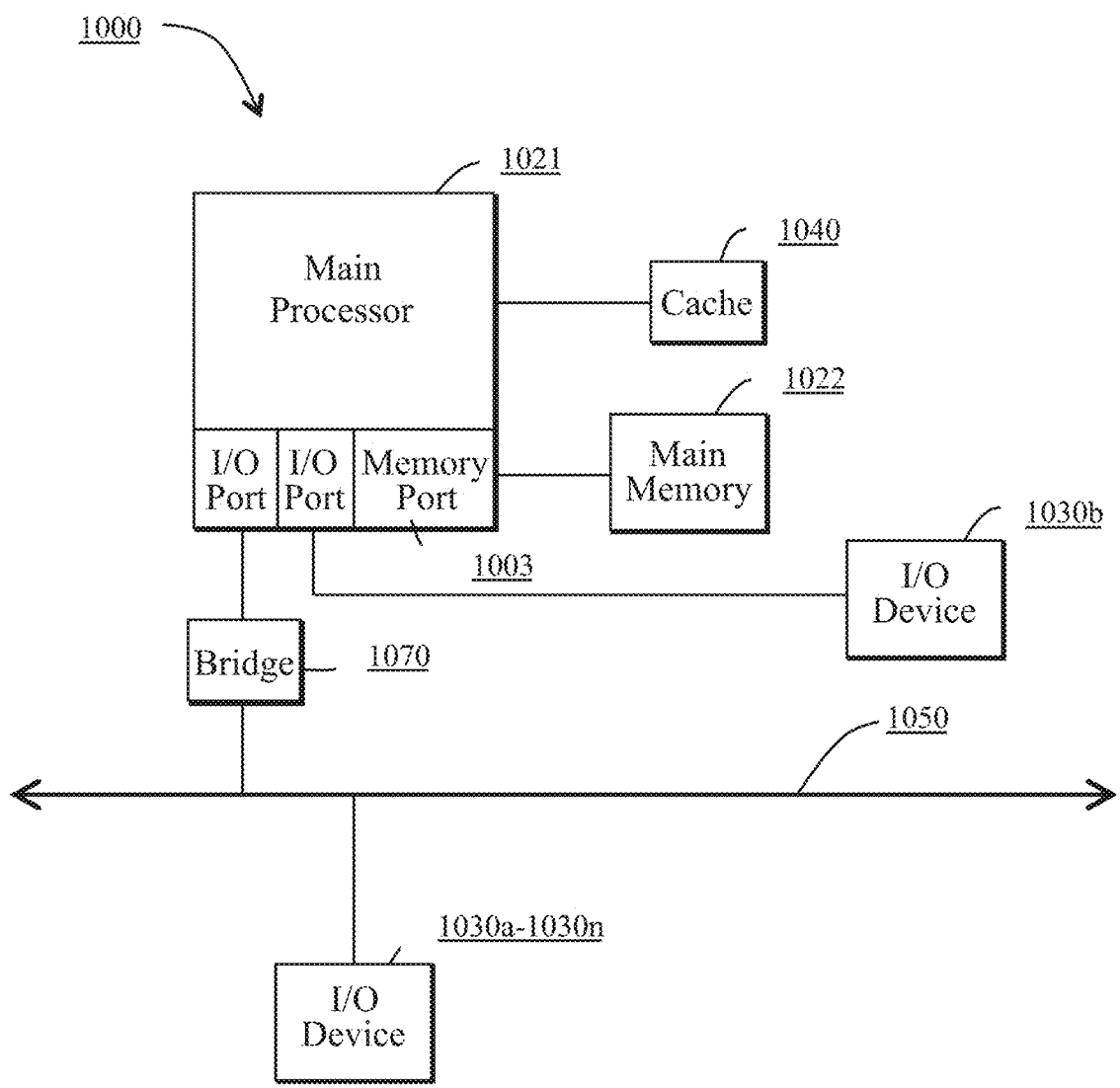

The communications device(s) 1002 and access point(s) 1006 may be deployed as and/or executed on any type and form of computing device, such as a computer, network device or appliance capable of communicating on any type and form of network and performing the operations described herein. FIGS. 10B and 10C depict block diagrams of a computing device 1000 useful for practicing an embodiment of the wireless communication devices 1002 or the access point 1006. As shown in FIGS. 10B and 10C, each computing device 1000 includes a central processing unit 1021, and a main memory unit 1022. As shown in FIG. 10B, a computing device 1000 may include a storage device 1028, an installation device 1016, a network interface 1018, an I/O controller 1023, display devices 1024a-1024n, a keyboard 1026 and a pointing device 1027, such as a mouse. The storage device 1028 may include, without limitation, an operating system and/or software. As shown in FIG. 10C, each computing device 1000 may also include additional optional elements, such as a memory port 1003, a bridge 1070, one or more input/output devices 1030a-1030n (generally referred to using reference numeral 1030), and a cache memory 1040 in communication with the central processing unit 1021.

The central processing unit 1021 is any logic circuitry that responds to and processes instructions fetched from the main memory unit 1022. In many embodiments, the central processing unit 1021 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 1000 may be based on any of these processors, or any other processor capable of operating as described herein.

Main memory unit 1022 may be one or more memory chips capable of storing data and allowing any storage location to be directly accessed by the microprocessor 1021, such as any type or variant of Static random access memory (SRAM), Dynamic random access memory (DRAM), Ferroelectric RAM (FRAM), NAND Flash, NOR Flash and Solid State Drives (SSD). The main memory 1022 may be based on any of the above described memory chips, or any other available memory chips capable of operating as described herein. In the embodiment shown in FIG. 10B, the processor 1021 communicates with main memory 1022 via a system bus 1050 (described in more detail below). FIG. 10C depicts an embodiment of a computing device 1000 in which the processor communicates directly with main memory 1022 via a memory port 1003. For example, in FIG. 10C the main memory 1022 may be DRDRAM.

FIG. 10C depicts an embodiment in which the main processor 1021 communicates directly with cache memory 1040 via a secondary bus, sometimes referred to as a backside bus. In other embodiments, the main processor 1021 communicates with cache memory 1040 using the system bus 1050. Cache memory 1040 typically has a faster response time than main memory 1022 and is provided by, for example, SRAM, BSRAM, or EDRAM. In the embodiment shown in FIG. 10C, the processor 1021 communicates with various I/O devices 1030 via a local system bus 1050. Various buses may be used to connect the central processing unit 1021 to any of the I/O devices 1030, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1024, the processor 1021 may use an Advanced Graphics Port (AGP) to communicate with the display 1024. FIG. 10C depicts an embodiment of a computer 1000 in which the main processor 1021 may communicate directly with I/O device 1030b, for example via HYPERTRANSPORT, RAPIDIO, or INFINIBAND communications technology. FIG. 10C also depicts an embodiment in which local busses and direct communication are mixed: the processor 1021 communicates with I/O device 1030a using a local interconnect bus while communicating with I/O device 1030b directly.

A wide variety of I/O devices 1030a-1030n may be present in the computing device 1000. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 1023 as shown in FIG. 10B. The I/O controller may control one or more I/O devices such as a keyboard 1026 and a pointing device 1027, e.g., a mouse or optical pen. Furthermore, an I/O device may also provide storage and/or an installation medium 1016 for the computing device 1000. In still other embodiments, the computing device 1000 may provide USB connections (not shown) to receive handheld USB storage devices such as the USB Flash Drive line of devices manufactured by Twintech Industry, Inc. of Los Alamitos, Calif.

Referring again to FIG. 10B, the computing device 1000 may support any suitable installation device 1016, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1000 may further include a storage device, such as one or more hard disk drives or redundant arrays of independent disks, for storing an operating system and other related software, and for storing application software programs such as any program or software 1020 for implementing (e.g., configured and/or designed for) the systems and methods described herein. Optionally, any of the installation devices 1016 could also be used as the storage device. Additionally, the operating system and the software can be run from a bootable medium.

Furthermore, the computing device 1000 may include a network interface 1018 to interface to the network 1004 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1000 communicates with other computing devices 1000' via any type and/or form of gateway or tunneling protocol such as Secure Socket Layer (SSL) or Transport Layer Security (TLS). The network interface 1018 may include a built-in network adapter, network interface card, PCMCIA network card, card bus network adapter, wireless network adapter, USB network adapter, modem or any other device suitable for interfacing the computing device 1000 to any type of network capable of communication and performing the operations described herein.

In some embodiments, the computing device 1000 may include or be connected to one or more display devices 1024a-1024n. As such, any of the I/O devices 1030a-1030n and/or the I/O controller 1023 may include any type and/or form of suitable hardware, software, or combination of hardware and software to support, enable or provide for the connection and use of the display device(s) 1024a-1024n by the computing device 1000. For example, the computing device 1000 may include any type and/or form of video adapter, video card, driver, and/or library to interface, communicate, connect or otherwise use the display device(s) 1024a-1024n. In one embodiment, a video adapter may include multiple connectors to interface to the display device(s) 1024a-1024n. In other embodiments, the computing device 1000 may include multiple video adapters, with each video adapter connected to the display device(s) 1024a-1024n. In some embodiments, any portion of the operating system of the computing device 1000 may be configured for using multiple displays 1024a-1024n. One ordinarily skilled in the art will recognize and appreciate the various ways and embodiments that a computing device 1000 may be configured to have one or more display devices 1024a-1024n.

In further embodiments, an I/O device 1030 may be a bridge between the system bus 1050 and an external communication bus, such as a USB bus, an Apple Desktop Bus, an RS-232 serial connection, a SCSI bus, a FireWire bus, a FireWire 1000 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1000 of the sort depicted in FIGS. 10B and 10C may operate under the control of an operating system, which control scheduling of tasks and access to system resources. The computing device 1000 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 1000 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1000 has sufficient processor power and memory capacity to perform the operations described herein.

In some embodiments, the computing device 1000 may have different processors, operating systems, and input devices consistent with the device. For example, in one embodiment, the computing device 1000 is a smart phone, mobile device, tablet or personal digital assistant. In still other embodiments, the computing device 1000 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 1000 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method for hierarchical chain-of-security-monitoring of network devices, comprising:
   receiving, by a control server device from each of a plurality of additional devices deployed in a physical multi-tier hierarchy, an identification of security capabilities of each of the plurality of additional devices, wherein a first additional device at a first level of the physical multi-tier hierarchy forwards an identification of security capabilities from a second additional device at a second, lower level of the physical multi-tier hierarchy, and the second additional device is a child of the first additional device in the physical multi-tier hierarchy;
   determining, by the control server device, that a security capability of the second additional device exceeds a security capability of the first additional device;
   responsive to the determination, assigning the second additional device to a first level of a logical multi-tier hierarchy and the first additional device to a second, lower level of the logical multi-tier hierarchy, by the control server device, wherein the first additional device is a child of the second additional device in the logical multi-tier hierarchy, the logical multi-tier hierarchy based on security capabilities of each additional device;
   wherein the second additional device applies one or more security policies to data communicated with the first additional device by a third device, responsive to the first additional device being a child of the second additional device in the logical multi-tier hierarchy;
   wherein the second additional device receives an identification of packets transmitted to or from the first additional device; and
   wherein the second additional device directs the first additional device to discard a subset of the packets transmitted to or from the first additional device corresponding to a filtering policy.

2. The method of claim 1, wherein the security policies comprise applying filtering policies to packets transmitted to or from the first additional device.

3. The method of claim 2, wherein the filtering policies are generated by a machine learning system of the third device trained from a historical record of data communicated by the plurality of additional devices.

4. The method of claim 1, wherein the second additional device directs the first additional device to discard the subset of the packets responsive to the packets transmitted to or from the first additional device exceeding a threshold corresponding to the filtering policy.

5. The method of claim 1, wherein the second additional device receives the identification of packets transmitted to or from the first additional device via a first physical layer connection.

6. The method of claim 5, further comprising receiving, by the control server device from the first additional device, the identification of packets transmitted to or from the first additional device; and forwarding, by the control server device to the second additional device, the received identification.

7. A system for hierarchical chain-of-security-monitoring of network devices, comprising:
   a control server device in communication with a plurality of additional devices deployed in a physical multi-tier hierarchy configured to:
      receive, from each additional device, an identification of security capabilities of the additional device, wherein a first additional device at a first level of the physical multi-tier hierarchy forwards an identification of security capabilities from a second additional device at a second, lower level of the physical multi-tier hierarchy, and the second additional device is a child of the first additional device in the physical multi-tier hierarchy;
      determine that a security capability of the second additional device exceeds a security capability of the first additional device; and
      responsive to the determination, assign the second additional device to a first level of a logical multi-tier hierarchy and the first additional device to a second, lower level of the logical multi-tier hierarchy, wherein the first additional device is a child of the second additional device in the logical multi-tier hierarchy, the logical multi-tier hierarchy based on security capabilities of each additional device;
   wherein the second additional device applies one or more security policies to data communicated with the first additional device by a third device, responsive to the first additional device being a child of the second additional device in the logical multi-tier hierarchy;

wherein the second additional device receives an identification of packets transmitted to or from the first additional device; and wherein the second additional device directs the first additional device to discard a subset of the packets transmitted to or from the first additional device corresponding to a filtering policy.

8. The system of claim 7, wherein the security policies comprise applying filtering policies to packets transmitted to or from the first additional device.

9. The system of claim 8, wherein the filtering policies are generated by a machine learning system of the third device trained from a historical record of data communicated by the plurality of additional devices.

10. The system of claim 7, wherein the second additional device directs the first additional device to discard the subset of the packets responsive to the packets transmitted to or from the first additional device exceeding a threshold corresponding to the filtering policy.

11. The system of claim 10, wherein the second additional device receives the identification of packets transmitted to or from the first additional device via a first physical layer connection.

12. The system of claim 11, wherein the control server device is further configured to receive, from the first additional device, the identification of packets transmitted to or from the first additional device; and forward, to the second additional device, the received identification.

* * * * *